(12) United States Patent
Song et al.

(10) Patent No.: US 10,976,599 B2
(45) Date of Patent: Apr. 13, 2021

(54) BACKLIGHT UNIT AND DISPLAY DEVICE INCLUDING THE SAME

(71) Applicant: Samsung Display Co., Ltd., Yongin-si (KR)

(72) Inventors: Hee Kwang Song, Suwon-si (KR); Ju Young Yoon, Seoul (KR); Ki Se Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/550,267

(22) Filed: Aug. 25, 2019

(65) Prior Publication Data

US 2020/0124886 A1   Apr. 23, 2020

(30) Foreign Application Priority Data

Oct. 18, 2018 (KR) .................. 10-2018-0124680

(51) Int. Cl.
| | | |
|---|---|---|
| *G02F 1/13357* | (2006.01) | |
| *F21V 8/00* | (2006.01) | |
| *F21V 9/30* | (2018.01) | |
| *F21K 9/64* | (2016.01) | |
| *G02F 1/1335* | (2006.01) | |

(52) U.S. Cl.
CPC ......... *G02F 1/1336* (2013.01); *G02B 6/0043* (2013.01); *G02B 6/0055* (2013.01); *G02B 6/0068* (2013.01); *G02B 6/0076* (2013.01); *G02B 6/0083* (2013.01); *G02B 6/0088* (2013.01); *G02B 6/0091* (2013.01); *G02B 6/0093* (2013.01); *G02F 1/133617* (2013.01); *F21V 9/30* (2018.02); *G02F 1/133614* (2021.01)

(58) Field of Classification Search
CPC .. G02B 6/0075; G02B 6/0076; G02B 6/0043; G02B 2207/113; G02B 6/005; G02B 6/0051; G02B 6/0033; G02B 6/0035; G02F 1/133617; G02F 1/133609; G02F 2001/133614; F21K 9/64; F21V 9/30
USPC .............. 362/97.1–97.4, 616, 84; 349/71, 65
See application file for complete search history.

(56) References Cited

U.S. PATENT DOCUMENTS

| | | | | |
|---|---|---|---|---|
| 5,786,665 | A * | 7/1998 | Ohtsuki | G02B 6/0021 313/512 |
| 8,651,725 | B2 * | 2/2014 | Ie | G02B 6/0045 362/607 |
| 9,736,900 | B1 * | 8/2017 | Stuppi | F21V 9/06 |
| 10,036,846 | B2 * | 7/2018 | Lee | G02B 6/0076 |
| 10,168,461 | B2 | 1/2019 | Oh et al. | |

(Continued)

FOREIGN PATENT DOCUMENTS

| | | | | |
|---|---|---|---|---|
| KR | 10-1613959 | | 4/2016 | |
| WO | WO-2016062299 A2 * | | 4/2016 | ....... B32B 17/10036 |

OTHER PUBLICATIONS

Wilkop, Glass sheet and glass assembly, Apr. 28, 2016, WO2016062299A2 (Year: 2016).*

*Primary Examiner* — Bryon T Gyllstrom
*Assistant Examiner* — James M Endo
(74) *Attorney, Agent, or Firm* — H.C. Park & Associates, PLC

(57) ABSTRACT

A backlight unit includes a first light guide plate, a second light guide plate disposed over the first light guide plate, and a first wavelength conversion layer disposed between the first light guide plate and the second light guide plate.

22 Claims, 13 Drawing Sheets

(56) References Cited

U.S. PATENT DOCUMENTS

| | | | |
|---|---|---|---|
| 2003/0184990 A1* | 10/2003 | Lin | G02B 6/0068 362/616 |
| 2005/0135115 A1* | 6/2005 | Lamb | G02B 6/0076 362/613 |
| 2007/0147088 A1* | 6/2007 | Chien | G02B 6/0043 362/616 |
| 2009/0316388 A1* | 12/2009 | Chang | G02B 6/002 362/97.1 |
| 2010/0259485 A1* | 10/2010 | Chuang | G06F 3/0202 345/173 |
| 2012/0105765 A1* | 5/2012 | Kawai | G02B 6/0076 349/62 |
| 2012/0212931 A1* | 8/2012 | Kinoshita | F21K 9/61 362/84 |
| 2013/0033901 A1* | 2/2013 | Nishitani | G02B 6/0061 362/613 |
| 2014/0043377 A1* | 2/2014 | Tanaka | G02B 6/0076 345/690 |
| 2014/0146271 A1* | 5/2014 | Hung | G02B 6/0011 349/62 |
| 2014/0218965 A1* | 8/2014 | Kim | G02B 6/0075 362/607 |
| 2014/0218967 A1* | 8/2014 | Kuroki | G02B 6/0003 362/612 |
| 2014/0268629 A1* | 9/2014 | Krishnaswamy | G02B 6/006 362/23.1 |
| 2014/0293578 A1* | 10/2014 | Gibson | F21V 33/0052 362/84 |
| 2015/0268399 A1* | 9/2015 | Futterer | G02B 30/00 315/151 |
| 2016/0154275 A1* | 6/2016 | Saneto | G02F 1/133553 349/114 |
| 2016/0170262 A1* | 6/2016 | Saneto | G02F 1/133617 349/71 |
| 2016/0178834 A1* | 6/2016 | Yu | G02B 6/0076 362/19 |
| 2016/0320550 A1* | 11/2016 | Tsai | G02B 6/0091 |
| 2016/0349427 A1* | 12/2016 | Lin | G02B 6/005 |
| 2017/0010407 A1* | 1/2017 | Huang | G02B 6/0073 |
| 2017/0059939 A1* | 3/2017 | Kwon | G02F 1/1313 |
| 2017/0125650 A1 | 5/2017 | Pickett et al. | |
| 2017/0192158 A1* | 7/2017 | Lee | H04N 13/32 |
| 2018/0106948 A1* | 4/2018 | Wong | G02B 6/0036 |

* cited by examiner

BACKLIGHT UNIT AND DISPLAY DEVICE INCLUDING THE SAME

CROSS REFERENCE TO RELATED APPLICATION

This application claims priority from and the benefit of Korean Patent Application No. 10-2018-0124680, filed on Oct. 18, 2018, which is hereby incorporated by reference for all purposes as if fully set forth herein.

BACKGROUND

Field

Exemplary embodiments of the invention relate generally to a backlight unit and a display device including the same and, more particularly, to a backlight unit having a wavelength converter and a display device including the same.

Discussion of the Background

A liquid crystal display device receives light from a backlight unit and displays an image. The backlight unit includes a light source and a light guide plate. The light guide plate receives light from the light source and guides the traveling direction of the light toward a display panel. In some products, white light is provided from a light source, and this white light is filtered by a color filter of a display panel to express a color.

Recently, applications of a wavelength conversion material to improve image quality such as color reproducibility of a liquid crystal display device have been researched. The conversion efficiency of the wavelength conversion material is changed according to the wavelength of light emitted from the light source, and power consumption may be increased when a low-efficiency light source is used.

The above information disclosed in this Background section is only for understanding of the background of the inventive concepts, and, therefore, it may contain information that does not constitute prior art.

SUMMARY

Backlight units and display device incorporating the same constructed according to the principles and exemplary embodiments of the invention are capable of reducing power consumption.

Optical members constructed according to the principles and exemplary embodiments of the invention may perform both a light guide function and a wavelength conversion function with an integrated single member, thereby simplifying the assembly process of the display device.

Additional features of the inventive concepts will be set forth in the description which follows, and in part will be apparent from the description, or may be learned by practice of the inventive concepts.

According to an exemplary embodiment of the invention, a backlight unit includes a first light guide plate, a second light guide plate disposed over the first light guide plate, and a first wavelength conversion layer disposed between the first light guide plate and the second light guide plate.

According to an exemplary embodiment of the invention, a display device includes a backlight unit including first light guide plate, a second light guide plate disposed over the first light guide plate, and a wavelength conversion layer disposed between the first light guide plate and the second light guide plate.

The backlight unit may further include a first light source and a second light source, wherein the first light source is disposed adjacent to one side surface of the first light guide plate, and the second light source is disposed adjacent to one side surface of the second light guide plate.

The first light source may be configured to emit a first near-ultraviolet light, and the second light source may be configured to emit a second blue light.

The backlight may further include a first low refractive layer disposed between the first light guide plate and the first wavelength conversion layer, wherein the first low refractive layer has a lower refractive index than the first light guide plate.

The backlight unit may further include a first protective layer covering the first low refractive layer and disposed between the second light guide plate and the first wavelength conversion layer.

The backlight unit may further include a second low refractive layer and a second protective layer, both of which are disposed on the second light guide plate, wherein the second low refractive layer is disposed between the second light guide plate and the second protective layer.

The backlight unit may further include an optical filter disposed between the first wavelength conversion layer and the second light guide plate, wherein the optical filter is configured to reflect the second light, and to transmit other light.

The first wavelength conversion layer may include first wavelength conversion material particles, and the first wavelength conversion material particles are configured to convert the first light into green light.

The first wavelength conversion layer may include second wavelength conversion material particles, and the second wavelength conversion material particles are configured to convert the first light into red light.

The backlight unit may further include a second wavelength conversion layer disposed on the second light guide plate, wherein the second wavelength conversion layer includes red fluorescent material particles.

The first light source may overlap the second light source in a substantially vertical direction.

The first light source and the second light source may be disposed oppose each other, and the first light guide plate and the second light guide plate may be disposed between the first light source and the second light source.

The backlight unit may further include a reflective member disposed under the first light guide plate.

The first light guide plate may include a first scattering pattern disposed on a surface opposite to a surface facing the first wavelength conversion layer, and the second light guide plate includes a second scattering pattern disposed on a surface facing the first wavelength conversion layer.

The first light guide plate may include a first edge surface between an upper surface or lower surface of the first light guide plate and one side surface of the first light guide plate, and the second light guide plate may include a second edge surface between an upper surface or lower surface of the second light guide plate and one side surface of the second light guide plate.

The backlight unit may further include a first tape member covering the side surface of the first light guide plate opposing the side surface of the second light guide plate; and a second tape member covering the side surface of the second light guide plate opposing the side surface of the first light guide plate, wherein each of the first tape member and the second tape member includes a light reflecting material.

The backlight unit may further include a first light source and a second light source, wherein the first light source faces a lower surface of the first light guide plate, and the second light source is disposed adjacent to one side surface of the second light guide plate.

The first light source may further include a printed circuit board and a plurality of light emitting elements, and the plurality of light emitting elements may be arranged in a matrix form spaced apart from each other.

The first light source may be configured to emit a first light having a peak wavelength of about 390 nm to about 410 nm, and the second light source may be configured to emit a second blue light having a peak wavelength of about 430 nm to about 470.

The backlight unit may further include an optical filter disposed between the first wavelength conversion layer and the second light guide plate, wherein the optical filter is configured to reflect the second light, and transmit other light.

The first wavelength conversion layer may further include first wavelength conversion material particles and second wavelength conversion material particles, and the first wavelength conversion material particles may be configured to convert the first light into green light, and the second wavelength conversion material particles are configured to convert the first light into red light.

According to an exemplary embodiment of the invention, a display device including a backlight unit with a first light guide plate, a second light guide plate disposed over the first light guide plate, and a wavelength conversion layer disposed between the first light guide plate and the second light guide plate; and a display panel disposed over the backlight unit.

The display device may further include an optical film, wherein the optical film is disposed between the backlight unit and the display panel, and includes at least one of a prism film, a diffusion film, a microlens film, a lenticular film, a polarizing film, a reflective polarizing film, and a retardation film.

The display device may further include a first light source and a second light source, wherein the first light source is disposed adjacent to one side surface of the first light guide plate, and the second light source is disposed adjacent to one side surface of the second light guide plate.

The first light source may be configured to emit a first light having a peak wavelength of about 390 nm to about 410 nm, and the second light source may be configured to emit a second blue light having a peak wavelength of about 430 nm to about 470 nm, and wherein the wavelength conversion layer may include first wavelength conversion material particles and second wavelength conversion material particles, and the first wavelength conversion material particles may be configured to convert the first light into green light, and the second wavelength conversion material particles may be configured to convert the first light into red light.

The display device may include an optical filter disposed between the wavelength conversion layer and the second light guide plate, wherein the optical filter is configured to reflect the second light, and transmit other light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
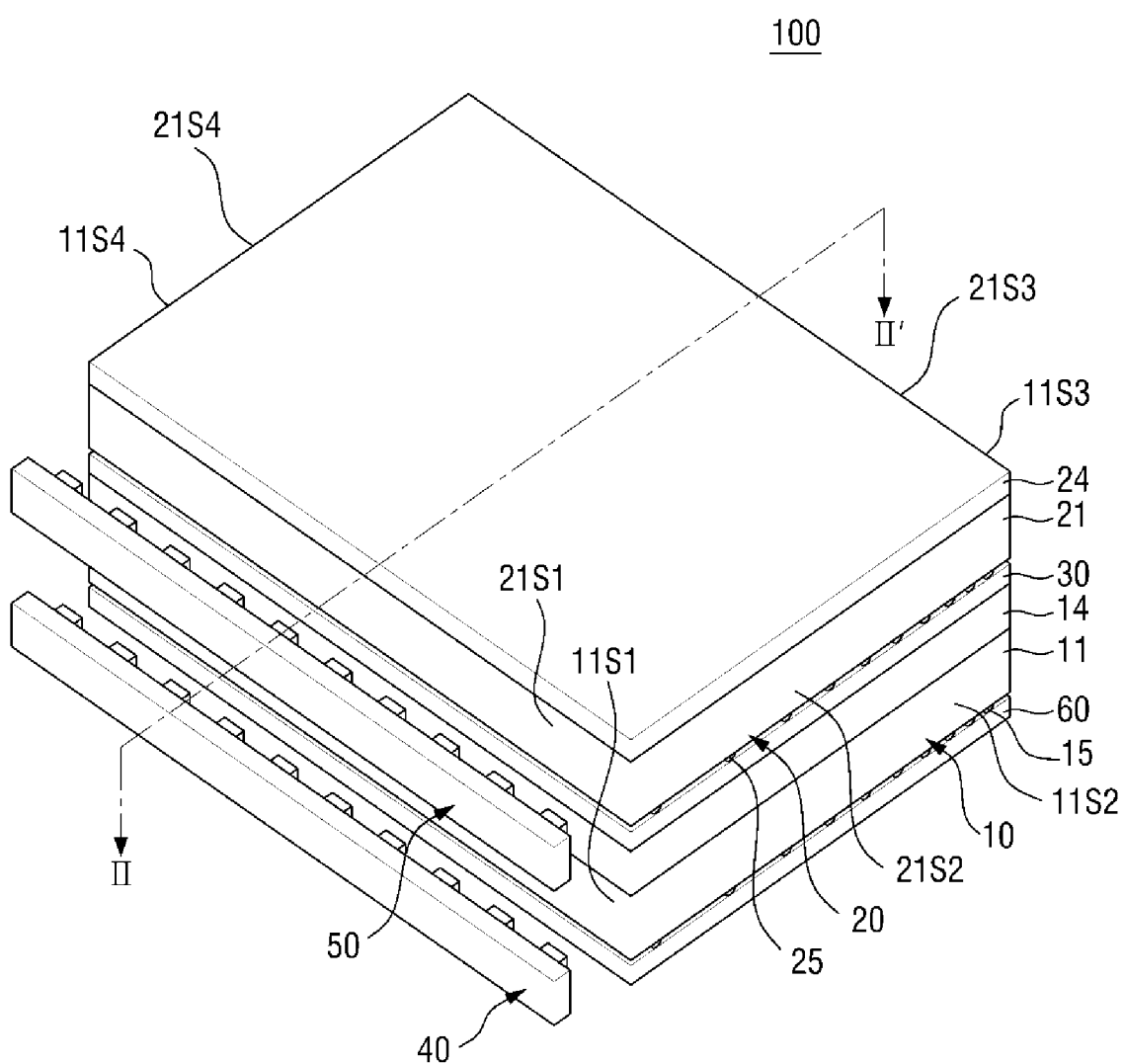
FIG. 1 is a perspective view of an exemplary embodiment of a backlight unit constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the invention will be described with reference to the attached drawings.

Figure 2:
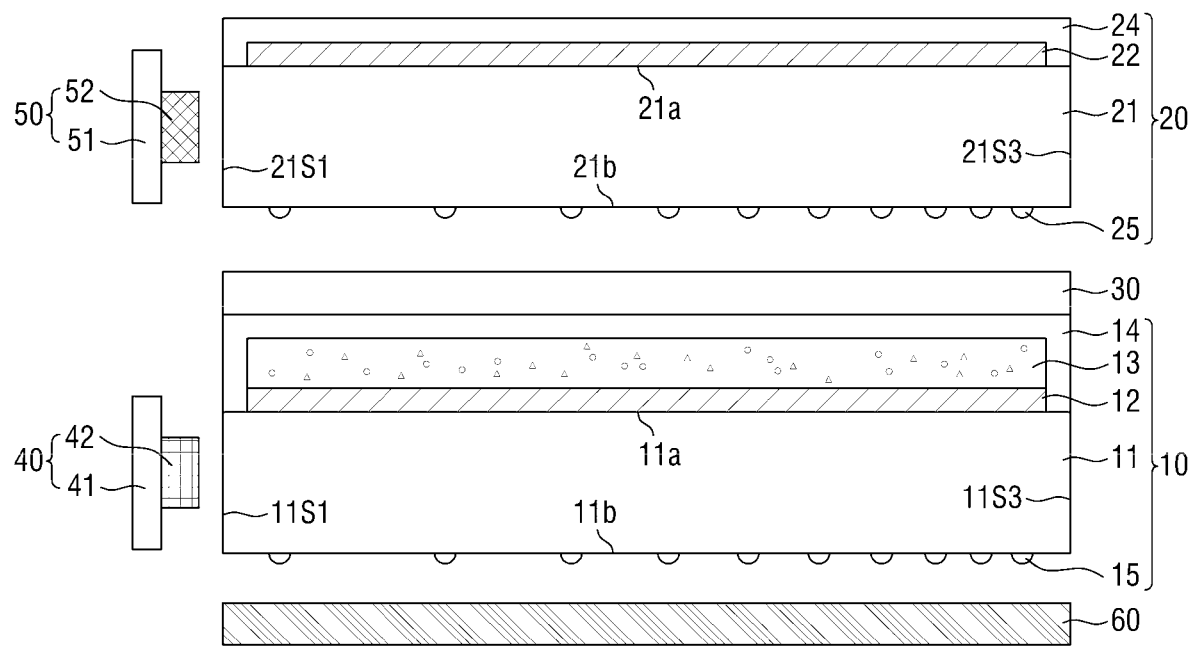
FIG. 2 is a cross-sectional view taken along the line II-IF of FIG. 1.

FIG. 1 is a perspective view of an exemplary embodiment of a backlight unit constructed according to an the principles of the invention. FIG. 2 is a cross-sectional view taken along the line II-IF of FIG. 1.

Referring to FIGS. 1 and 2, a backlight unit 100 includes a first optical member 10, a second optical member 20 disposed on the first optical member 10, a first light source 40 disposed on one side surface of the first optical member 10, and a second light source 50 disposed on one side surface of the second optical member 20. The backlight unit 100 may further include an optical filter 30 disposed between the first optical member 10 and the second optical member 20 and a reflective member 60 disposed under the first optical member 10.

The first optical member 10 may include a first light guide plate 11, a first low refractive layer 12 disposed on the first light guide plate 11, a wavelength conversion layer 13 disposed on the first low refractive layer 12, and a first protective layer 14 disposed on the wavelength conversion layer 13. The first optical member 10 may further include a first scattering pattern 15 disposed on the lower surface 11b of the first light guide plate 11.

The first light guide plate 11 serves to guide the traveling path of light. The first light guide plate 11 may have a substantially polygonal columnar shape. The planar shape of the first light guide plate 11 may be rectangular, but is not limited thereto. In an exemplary embodiment, the first light guide plate 11 may have a hexagonal columnar shape with a rectangular planar shape, and the hexagonal columnar shape may include an upper surface 11a, a lower surface 11b, and four side surfaces 11S1, 11S2, 11S3, and 11S4. In the specification and the accompanying drawings, when it is necessary to distinguish the four side surfaces from each other, they are marked as "11S1", "11S2", "11S3", and "11S4", respectively, but in the case of simply referring to a side surface, it is marked as "11s".

In an exemplary embodiment, each of the upper surface 11a and lower surface 11b of the first light guide plate 11 is located in one respective plane. The plane on which the upper surface 11a is located and the plane on which the lower surface 11b is located may be substantially parallel to each other, and thus the first light guide plate 11 may have a generally uniform thickness as a whole. However, the invention is not limited thereto, and the upper surface 11a or the lower surface 11b may be formed in a plurality of planes, or the plane on which the upper surface 11a is located and the plane on which the lower surface 11b is located may intersect each other. For example, with a wedge-typed first light guide plate 11, the thickness thereof may become thinner from one side surface (for example, light incidence surface) to the other side surface (for example, light facing surface) facing the one side surface. Further, up to a certain point, in the vicinity of one side surface (for example, light incidence surface), the lower surface 11b is inclined upward toward the other side surface (for example, light facing surface) facing the one side surface to reduce the thickness thereof, and then the upper surface 11a and the lower surface 11b may be formed in a substantially flat shape.

The plane on which the upper surface 11a and/or the lower surface 11b is located may form an angle of about 90° with the plane on which each side surface 11s is located. In some exemplary embodiments, the first light guide plate 11 may further include an inclined surface between the upper surface 11a and one side surface 11s or between the lower surface 11b and one side surface 11s. Hereinafter, for explanatory convenience, the case where the upper surface and the side surface directly meet each other without the inclined surface to form an angle of 90° will be described.

The first scattering pattern 15 may be disposed on the lower surface 11b of the first light guide plate 11. The first scattering pattern 15 serves to change the traveling angle of light in the first light guide plate 11 using total reflection and emit the light to the outside of the first light guide plate 11.

In an exemplary embodiment, the first scattering pattern 15 may be provided as a separate layer or pattern. For example, a pattern layer including a protruding pattern and/or a concave groove pattern is formed on the lower surface 11b of the first light guide plate 11, or a print pattern is formed thereon, so as to allow the pattern layer or the print pattern to function as the first scattering pattern 15.

In another exemplary embodiment, the first scattering pattern 15 may be formed to have a surface shape of the first light guide plate 11 itself. For example, a concave groove is formed on the lower surface 11b of the first light guide plate 11 to allow the concave groove to function as the first scattering pattern 15.

The arrangement density of the first scattering pattern 15 may differ depending on a region. For example, the arrangement density of the first scattering pattern 15 may become low in the region adjacent to the light incidence surface 11S1, which is relatively rich in light quantity, and the arrangement density thereof may become high in the region adjacent to the light facing surface 11S3, which is relatively poor in light quantity.

The first light guide plate 11 may include an inorganic material. For example, the first light guide plate 11 may be made of glass, but the invention is not limited thereto.

The backlight unit 100 may include a first light source 40 disposed to face one side surface of the first light guide plate 11.

The first light source 40 may be disposed adjacent to at least one side surface 11s of the first light guide plate 11. In the drawings, there is exemplified a case where a printed circuit board 41 and a plurality of first light emitting elements 42 mounted on the printed circuit board 41 are disposed adjacent to the side surface 11S1 located at one long side of the first light guide plate 11, but the invention is not limited thereto. For example, the plurality of first light emitting elements 42 may be disposed adjacent to all sides surfaces 11S1 and 11S3 of both short sides of the first light guide plate 11, or may be disposed adjacent to sides surfaces 11S2 and 11S4 of one short side or both short sides of the first light guide plate 11. In the exemplary embodiment of FIGS. 1 and 2, the side surface 11S1 of one long side of the first light guide plate 11, on which the first light source 40 is disposed, is referred to as a light incidence surface (marked as '11S1' for convenience of explanation in the drawings) on which the light of the first light source 40 is directly incident, and the side surface 11S3 of the other long side of the first light guide plate 11, facing the side surface 11S1, is referred to as a light facing surface (marked as '11S3' for convenience of explanation in the drawings).

The first light emitting element 42 may emit near-ultraviolet light. That is, the light emitted from the first light emitting element 42 may be light having a wavelength band shorter than that of light having a blue wavelength band. In an exemplary embodiment, the near-ultraviolet light emitted from the first light emitting element 42 may be light having a peak wavelength of about 390 nm to about 410 nm. The near-ultraviolet light emitted from the first light emitting element 42 may enter the inside of the first light guide plate 11 through the light incidence surface 11S1.

The first low refractive layer 12 is disposed on the upper surface 11a of the first light guide plate 11. The first low refractive layer 12 may formed directly on the upper surface 11a of the first light guide plate 11 to be in contact with the upper surface 11a of the first light guide plate 11. The first low refractive layer 12 is interposed between the first light guide plate 11 and the wavelength conversion layer 13 to help total reflection of the first light guide plate 11.

More specifically, in order for the first light guide plate 11 to efficiently guide light from the light incidence surface 11S1 to the light facing surface 11S3, it is preferable that effective total internal reflection is performed on the upper surface 11a and lower surface 11b of the first light guide plate 11. One of the conditions under which total internal reflection can be performed in the first light guide plate 11 is that the refractive index of the first light guide plate 11 is larger than the refractive index of a medium forming an optical interface together with the first light guide plate 11. As the refractive index of the medium forming the optical interface together with the first light guide plate 11 becomes lower, a total reflection critical angle becomes smaller, so that more total internal reflections can be performed.

In the case where the first light guide plate 11 is made of glass having a refractive index of about 1.5, since the lower surface 11b of the first light guide plate 11 is exposed to an air layer to form an interface therebetween, sufficient total reflection may be performed.

On the other hand, since other optical functional layers are integrally laminated on the upper surface 11a of the first light guide plate 11, it is difficult to obtain sufficient total reflection as compared with the lower surface 11b thereof. For example, when a material layer having a refractive index of 1.5 or more is laminated on the upper surface 11a of the first light guide plate 11, total reflection cannot be performed on the upper surface 11a of the first light guide plate 11. Further, when a material layer having a refractive index slightly smaller than that of the first light guide plate 11, for example, about 1.49, is laminated on the upper surface 11a of the first light guide plate 11, internal total reflection can be performed on the upper surface 11a of the first light guide plate 11, but sufficient total reflection cannot be performed because the critical angel is too large. The wavelength conversion layer 13 laminated over the upper surface 11a of the first light guide plate 11 generally has a refractive index of about 1.5. When this wavelength conversion layer 13 is directly laminated on the upper surface 11a of the first light guide plate 11, it is difficult to obtain sufficient total reflection on the upper surface 11a of the first light guide plate 11.

The first low refractive layer 12 is interposed between the first light guide plate 11 and the wavelength conversion layer 13 to form an interface together with the upper surface 11a of the first light guide plate 11, and has a lower refractive index than the first light guide plate 11, so as to allow total reflection to be performed on the upper surface 11a of the first light guide plate 11. Further, the first low refractive layer 12 has a lower refractive index than the wavelength conversion layer 13, which is a material layer disposed thereon, so as to allow more total reflections to be performed compared to when the wavelength conversion layer 13 is directly disposed on the upper surface 11a of the first light guide plate 11.

The difference in refractive index between the first light guide plate 11 and the first low refractive layer 12 may be about 0.2 or more. When the refractive index of the first low refractive layer 12 is smaller than the refractive index of the first light guide plate 11 by about 0.2 or more, sufficient total reflection can be performed through the upper surface 11a of the first light guide plate 11. The upper limit of the difference in refractive index between the first light guide plate 11 and the first low refractive layer 12 is not particularly limited, but may be about 0.5 or less in consideration of the refractive indexes of the generally-used first light guide plate 11 and first low refractive layer 12.

The refractive index of the first low refractive layer 12 may be in a range of about 1.2 to about 1.4. Generally, as the refractive index of a solid medium is close to 1, the manufacturing cost thereof exponentially increases. When the refractive index of the first low refractive layer 12 is about 1.2 or more, an excessive increase in manufacturing cost can be prevented. Further, when the refractive index of the first low refractive layer 12 is about 1.4 or less, it is advantageous to sufficiently decrease the total reflection critical angle of the upper surface 11a of the first light guide plate 11. In an exemplary embodiment, a first low refractive layer 12 having a refractive index of about 1.25 may be applied.

The first low refractive layer 12 may include voids to exhibit the above-mentioned low refractive index. The voids may be formed in a vacuum, or may be filled with an air layer, gas, or the like. The void space may be defined by particles, matrices, or the like. Details thereof will be described with reference to FIGS. 3 and 4.

Figure 3:
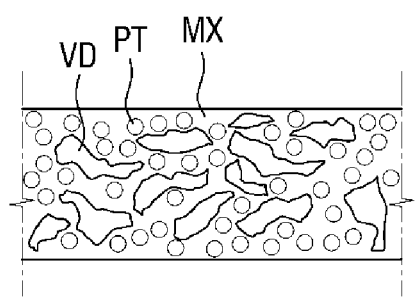
FIGS. 3 and 4 are schematic, cross-sectional views of low refractive layers constructed according to various exemplary embodiments of the invention.
Figure 4:
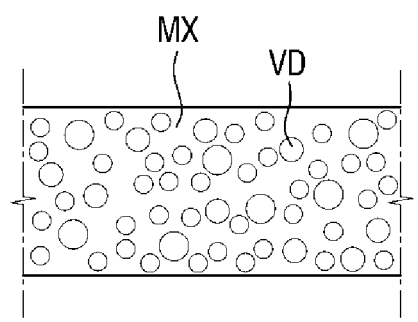

FIGS. 3 and 4 are schematic, cross-sectional views of low refractive layers constructed according to various exemplary embodiments of the invention.

In an exemplary embodiment, as shown in FIG. 3, the first low refractive layer 12 may include a plurality particles PT, a matrix MX surrounding the particles PT, and voids VD. The particles PT may be filler for adjusting the refractive index and mechanical strength of the first low refractive layer 12.

In the first low refractive layer 12, the particles PT may be dispersed in the matrix MX, and the matrix MX may be partially widened to form the voids VD at the corresponding sites. For example, when the particles PT and the matrix MX are mixed with a solvent and then the mixture is dried and/or cured to remove the solvent, the voids VD may be formed in the matrix MX.

In another exemplary embodiment, as shown in FIG. 4, the first low refractive layer 12 may include a matrix MX and voids VD without particles. For example, the first low refractive layer 12 may include a matrix MX such as a foam resin, and a plurality of voids dispersed in the matrix MX.

As shown in FIGS. 3 and 4, when the first low refractive layer 12 includes the voids VD, the total refractive index of the first low refractive layer 12 may have a value between the refractive index of the particles PT/matrix MX and the refractive index of the voids VD. As described above, when each of the voids VD is vacuum having a refractive index of 1, is an air layer having a refractive index of about 1, or is filled with gas or the like, the total refractive index of the first low refractive layer 12 may be about 1.4 or less, for example, about 1.25 even when a material having a refractive index of about 1.4 or more is used for the particles PT/the matrix MX. In an exemplary embodiment, the particles PT may be made of an inorganic material such as $SiO_2$, $Fe_2O_3$, or $MgF_2$, and the matrix MX may be made of an organic material such as polysiloxane. Besides, the particles PT/the matrix MX may be made of another organic material or another inorganic material.

Referring to FIGS. 1 and 2 again, the thickness of the first low refractive layer 12 may be from about 0.4 μm to about 2 μm. When the thickness of the first low refractive layer 12 about 0.4 μm or more, which is a visible light wavelength range, an effective optical interface may be formed together with the upper surface 11a of the first light guide plate 11, so that the total reflection according to Snell's law may be performed effectively on the upper surface 11a of the first light guide plate 11. When the first low refractive layer 12 is too thick, it increases the thickness of the first optical member 10, increases material costs, and is disadvantageous in terms of luminance characteristics, so that it is preferred that the first low refractive layer 12 be formed to have a thickness of about 2 μm or less.

In an exemplary embodiment, the first low refractive layer 12 covers most of the upper surface 11a of the first light guide plate 11, and may expose a part of the edge of the first light guide plate 11. In other words, the side surface 11s of the first light guide plate 11 may protrude with respect to the side surface 12s of the first low refractive layer 12. The upper surface 11a of the first light guide plate 11 to which the first low refractive layer 12 is exposed provides a space in which the side surface 12s of the first low refractive layer 12 may be stably covered by the first protective layer 14.

In another exemplary embodiment, the first low refractive layer 12 may cover the entire upper surface 11a of the first light guide plate 11. The side surfaces of the first low refractive layer 12 may be aligned with the respective side surfaces of the first light guide plate 11. The difference between these exemplary embodiments may be due to the manufacturing process of the first light guide plate 11.

The first low refractive layer 12 may be formed by a method such as coating. For example, the first low refractive layer 12 may be formed by coating the upper surface 11a of the first light guide plate 11 with a composition for a low refractive layer and then drying and curing the composition. Examples of the coating method of the composition for a low refractive layer may include, but are not limited to, slit coating, spin coating, roll coating, spray coating, and inkjet coating. Other various lamination methods may be used.

A barrier layer may further be provided between the first low refractive layer 12 and the first light guide plate 11. The barrier layer may cover the entire upper surface 11a of the first light guide plate 11. The side surface of the barrier layer may be aligned with the side surface his of the first light guide plate 11. The first low refractive layer 12 is formed in contact with the upper surface of the barrier layer. The first low refractive layer 12 may expose a part of the edge of the barrier layer.

The barrier layer, similarly to the first protective layer 14 to be described later, serves to prevent the permeation of impurities such as moisture and oxygen. The barrier layer may include an inorganic material. For example, the barrier layer may include silicon nitride, aluminum nitride, zirconium nitride, titanium nitride, hafnium nitride, tantalum nitride, silicon oxide, aluminum oxide, titanium oxide, tin oxide, cerium oxide, or silicon oxynitride. The barrier layer may include a metal thin film having light transmittance. The barrier layer may be made of the same material as the first protective layer 14, but the invention is not limited thereto. The barrier layer may be formed by a deposition method such as chemical vapor deposition.

The wavelength conversion layer 13 is disposed on the upper surface of the first low refractive layer 12. The wavelength conversion layer 13 converts the wavelength of at least a part of incident light. The wavelength conversion layer 13 may include a binder layer and wavelength conversion particles dispersed in the binder layer. The wavelength conversion layer 13 may further include scattering particles dispersed in the binder layer in addition to the wavelength conversion particles. Details of the wavelength conversion layer 13 will be described with reference to FIGS. 5 and 6.

Figure 5:
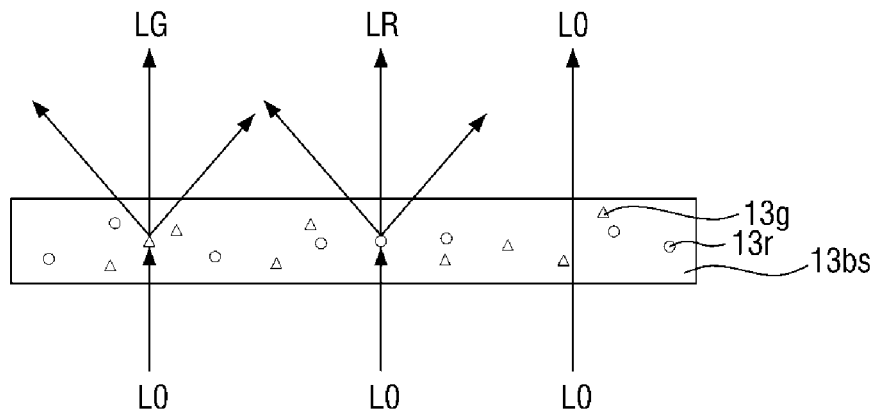
FIGS. 5 and 6 are schematic, cross-sectional views of wavelength conversion layers constructed according to various exemplary embodiments.

Referring to FIG. 5, the wavelength conversion layer 13 may include a binder layer 13bs and first wavelength conversion material particles 13g and second wavelength conversion material particles 13r dispersed in the binder layer 13bs.

The binder layer 13bs is a medium in which the wavelength conversion material particles 13g and 13r are dispersed, and may be made of various resin compositions which may be generally referred to as a binder. However, the invention is not limited thereto. In this specification, the medium may be referred to as a binder layer regardless of its name, other additional functions, constituent materials, and the like, as long as it can disperse the wave conversion particles and/or the scattering particles.

The wavelength conversion material particles 13g and 13r are particles for converting the wavelength of incident light, and may be, for example, quantum dots (QD), fluorescent material particles, or phosphorescent material particles. Hereinafter, the case where the wavelength conversion material particles 13g and 13r are quantum dots will be described, but the invention is not limited thereto.

Specifically explaining the quantum dots as an example of the wavelength conversion material particles, the quantum dot is a material having a crystal structure of several nanometers, is composed of several hundreds to several thousands of atoms, and exhibits a quantum confinement effect of increasing an energy bandgap due to a small size. When light having a wavelength higher than the energy bandgap of the quantum dot is applied to the quantum dot, the quantum dot absorbs the light to become an excited state, and emits light having a specific wavelength to fall to a ground state. The wavelength of the emitted light has a value corresponding to the energy bandgap. The quantum dots can control the luminescence characteristics due to the quantum confinement effect by adjusting the size and composition thereof.

The quantum dot may include at least one of a Group II-VI compound, a Group II-V compound, a Group III-VI compound, a Group III-V compound, a Group IV-VI compound, and a Group V compound.

The quantum dot may include a core and a shell overcoating the core. For example, the core may include, but is not limited to, at least one of CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, $Fe_2O_3$, $Fe_3O_4$, Si, and Ge. The shell may include, but is not limited to, at least one of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, and PbTe.

The wavelength conversion layer 13 may include a plurality of wavelength conversion material particles 13g and 13r converting incident light L0 into light of different wavelengths. For example, the wavelength conversion layer 13 may include first wavelength conversion material particles 13g converting incident light L0 of a specific wavelength into first light LG of a first wavelength and emitting the first light and second wavelength conversion material particles 13r converting the incident light L0 of a specific wavelength into second light LR of a second wavelength and emitting the second light. In an exemplary embodiment, the first wavelength may be a green wavelength, and the second wavelength may be a red wavelength. For example, the green wavelength is a wavelength having a peak at about 520 to about 570 nm, and the red wavelength may be a wavelength having a peak at about 620 nm to about 670 nm. That is, the first light is green light, and the second light is red light.

The first wavelength conversion material particles 13g may have relatively low light absorption efficiency as compared with the second wavelength conversion material particles 13r. That is, even if the same amount of incident light is applied, the amount of light converted by the second wavelength conversion material particles 13r and emitted to the outside may be larger. Therefore, the number of the first wavelength conversion material particles 13g included in the same volume of the wavelength conversion layer 13 may be larger than the number of the second wavelength conversion material particles 13r included therein. For example, the number of the first wavelength conversion material particles 13g may be 1.5 to 2.5 time larger than the number of the second wavelength conversion material particles 13r.

The wavelength of incident light L0 applied onto the wavelength conversion layer 13 may have a peak wavelength shorter than the peak wavelength of each of the first light LG and the second light LR. In an exemplary embodiment, the incident light L0 may be light having a peak wavelength of about 390 nm to about 410 nm. That is, the incident light L0 may be near-ultraviolet (nUV) light. When near-ultraviolet light having a shorter peak wavelength than blue light is used as the incident light L0, the wavelength conversion layer 13 may have higher light absorption efficiency than blue light. The light absorption efficiency will be described later with reference to FIG. 7.

In the above exemplary embodiment, the incident light L0 applied onto the wavelength conversion layer 13 passes through the wavelength conversion layer 13 and simultaneously a part of the incident light L0 enters the first wavelength conversion material particles 13g to be converted into a first light LG and emitted, another part of the incident light L0 enters the second wavelength conversion material particles 13r to be converted into a second light LR and emitted, and a residual part of the incident light L0 is directly emitted without entering the first wavelength conversion material particles 13g and the second wavelength conversion material particles 13r. Therefore, the light having passed through the wavelength conversion layer 13 includes the first light LG, the second light LR, and the incident light L0. When the incident light L0 is near-ultraviolet light as in the above-described exemplary embodiment, the incident light L0 may not be recognized by the user because this incident light L0 is out of a visible light range. Therefore, in the light having passing through the wavelength conversion layer 13, only the first light LG and the second light LR may be recognized, and for example, yellow light may be recognized.

The light converted through the wavelength conversion layer 13 is concentrated within a narrow range of specific wavelengths, and have a sharp spectrum with a narrow half width. Therefore, when colors are expressed by filtering the light of such a spectrum with a color filter, color reproducibility can be improved.

The wavelength conversion layer 13 may further include scattering particles. The scattering particles may be non-quantum particles, and may also be particles having no wavelength conversion function. The scattering particles can scatter incident light such that more incident light can be incident onto the wavelength conversion material particles. In addition, the scattering particles can serve to uniformly control the emission angle of light for each wavelength. Specifically explaining, when a part of the incident light is incident on the wavelength conversion material particles to convert a wavelength and then the light of the converted wavelength is emitted, the emission direction of the scattered light is random. If the scattering particles are included in the wavelength conversion layer 13, the scattering emission characteristics of the first light LG and second light LR emitted after the collision with the wavelength conversion material particles 13g and 13r are further improved, so as to improve the viewing angle characteristics of a display device. $TiO_2$, $SiO_2$, or the like may be used for the scattering particles.

The wavelength conversion layer 13 may be thicker than the first low refractive layer 12. The thickness of the wavelength conversion layer 13 may be about 10 μm to about 50 μm. In an exemplary embodiment, the thickness of the wavelength conversion layer 13 may be about 15 μm.

The wavelength conversion layer 13 may cover the upper surface of the first low refractive layer 12, and may completely overlap the first low refractive layer 12. The lower surface of the wavelength conversion layer 13 may be in direct contact with the upper surface of the first low refractive layer 12. In an exemplary embodiment, the side surface of the wavelength conversion layer 13 may be aligned with the side surface of the first low refractive layer 12. Although it is shown in FIG. 2 that the side surface of the wavelength conversion layer 13 and the side surface of the first low refractive layer 12 are vertically aligned with the upper surface 11a of the first light guide plate 11, the side surface of the wavelength conversion layer 13 and the side surface of the first low refractive layer 12 may not by perpendicular to the upper surface 11a of the first light guide plate 11, but may have an inclination angle smaller than 90°.

The inclination angle of the side surface of the wavelength conversion layer 13 may be smaller than the inclination angle of the side surface of the first low refractive layer 12. As will be described below, when the wavelength conversion layer 13 is formed by slit coating or the like, the side surface of the relatively thick wavelength conversion layer 13 may have a gentle inclination angle smaller than the side surface of the first low refractive layer 12. However, the invention is not limited thereto, and the inclination angle of the side surface of the wavelength conversion layer 13 may be substantially equal to or smaller than the inclination angle of the side surface of the first low refractive layer 12 depending on the forming method.

The wavelength conversion layer 13 may be formed by a method such as coating. For example, the wavelength conversion layer 13 may be formed by applying a wavelength conversion composition onto the first light guide plate 11 provided with the first low refractive layer 12 and then drying and curing the composition. However, the invention is not limited thereto, and various other lamination methods may be used.

In this exemplary embodiment, the wavelength conversion layer 13 is successively formed over the first light guide plate 11 and is integrated with the first light guide plate 11, but the invention is not limited thereto. That is, in another exemplary embodiment, the wavelength conversion layer 13 may be provided in the form of a wavelength conversion film. The wavelength conversion film can prevent the permeation of impurities such as moisture or oxygen by laminating barrier films on the upper and lower surfaces of the wavelength conversion layer 13. The wavelength conversion film including the wavelength conversion layer 13 may be attached to the first light guide plate 11 by an adhesive material such as optical clear resin (OCR) or optical clear adhesive (OCA).

Figure 6:
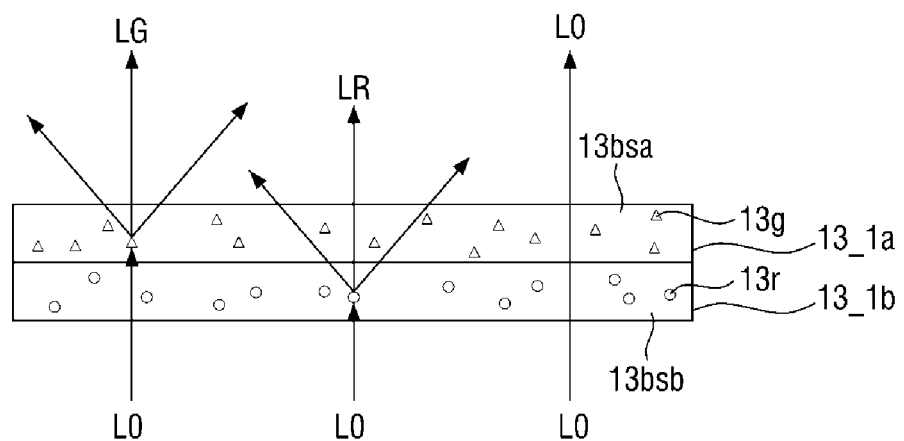

FIG. 6 shows a wavelength conversion layer 13_1 according to another exemplary embodiment. The exemplary embodiment of FIG. 6 is different from the exemplary embodiment of FIG. 5 where the wavelength conversion layer 13 includes different wavelength conversion material particles mixed with each other, in that the wavelength conversion layer 13_1 has a laminate structure of wavelength conversion layers including different wavelength conversion material particles. The same components as those of the previously described exemplary embodiment are denoted by the same reference numerals, and the description thereof will be omitted to avoid redundancy. Hereinafter, differences from the exemplary embodiment of FIG. 5 will be mainly described.

Referring to FIG. 6, the wavelength conversion layer 13_1 may include a first wavelength conversion layer 13_1a and a second wavelength conversion layer 13_1b disposed beneath the first wavelength conversion layer 13_1a.

The first wavelength conversion layer 13_1a may include a first binder layer 13bsa and first wavelength conversion material particles 13g dispersed in the first binder layer 13bsa. The second wavelength conversion layer 13_1b may include a second binder layer 13bsb and second wavelength conversion material particles 13r dispersed in the second binder layer 13bsb.

The first binder layer 13*bsa* may be a medium in which the first wavelength conversion material particles 13*g* and scattering particles are dispersed, and the second wavelength conversion layer 13_1*b* may be a medium in which the second wavelength conversion material particles 13*r* and scattering particles are dispersed. Although the first binder layer 13*bsa* and the second binder layer 13*bsb* may include different materials, if the wavelength conversion material particles 13*g* and 13*r* and the scattering particles can be uniformly dispersed and arranged, the material thereof is not limited, and the first binder layer 13*bsa* and the second binder layer 13*bsb* may include the same material.

The incident light L0 incident on the wavelength conversion layer 13_1 may be incident on the lower surface of the second wavelength conversion layer 13_1*b*. A part of the incident light L0 incident on the lower surface of the second wavelength conversion layer 13_1*b* may react with the first wavelength conversion material particles 13*g* of the first wavelength conversion layer 13_1*a* to be emitted as the first light LG. Another part of the incident light L0 may react with the second wavelength conversion material particles 13*r* of the second wavelength conversion layer 13_1*b* to be emitted as the second light LR. The residual incident light L0 that has not reacted with the first wavelength conversion material particles 13*g* and the second wavelength conversion material particles 13*r* may be emitted as it is.

The first wavelength conversion layer 13_1*a* may be disposed on the second wavelength conversion layer 13_1*b*. That is, the incident light L0 may be incident on the second wavelength conversion layer 13_1*b* before it incident on the first wavelength conversion layer 13_1*a*. Therefore, in the incident light L0, the second light LR emitted in reaction with the second wavelength conversion material particles 13*r* may pass through the first wavelength conversion layer 13_1*a*.

Since the second light LR has a longer peak wavelength than the first light LG even though the second light LR passes through the first wavelength conversion layer 13_1*a*, the wavelength of the second light LR may not be shifted by the first wavelength conversion material particles 13*g*. That is, the second light LR may be directly emitted to the outside without reacting with the first wavelength conversion material particles 13*g*.

Unlike this exemplary embodiment, when the second wavelength conversion layer 13_1*b* is disposed on the first wavelength conversion layer 13_1*a*, the first light LG having been emitted in reaction with the first wavelength conversion material particles 13*g* may react with the second wavelength conversion material particles 13*r* in the second wavelength conversion layer 13_1*b* to be emitted as the second light LR. That is, the first light LG emitted to the outside may decrease, and the second light LR may increase. Therefore, the overall color coordinate of the display device may be deviated.

Figure 7:
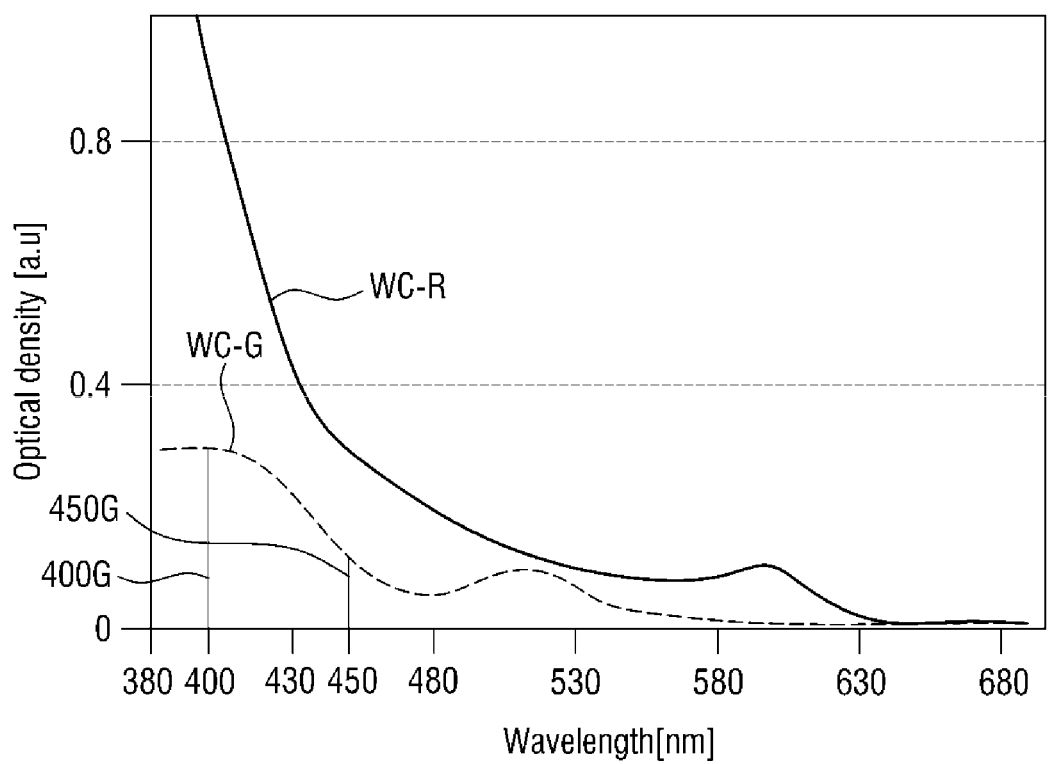
FIG. 7 is a graph schematically showing the absorption efficiency of wavelength conversion material particles according to an exemplary embodiment.

FIG. 7 is a graph schematically showing the absorption efficiency of wavelength conversion material particles according to an exemplary embodiment. The wavelength conversion material particles exemplarily illustrated in FIG. 7 may be the first wavelength conversion material particles 13*g* and second wavelength conversion material particles 13*r* having been described with reference to FIG. 5. In the graph of FIG. 7, the x-axis indicates a wavelength of incident light, and the y-axis indicates a light absorption rate. As the light absorption rate increases, a larger amount of light can be absorbed and then converted and emitted.

Referring to FIGS. 5 and 7, the first curve WC-G indicates the light absorption efficiency of the first wavelength conversion material particles 13*g* for each wavelength, and the second curve WC-R indicates the light absorption efficiency of the second wavelength conversion material particles 13*r* for each wavelength.

The light absorption efficiencies may be different depending on the kind of wavelength conversion material particles even if light of the same wavelength is incident. As described above, the light absorption efficiency of the second wavelength conversion material particles 13*r* may be higher than the light absorption efficiency of the first wavelength conversion material particles 13*g*.

For example, the second curve WC-R is generally located above the first curve WC-G. This means that the light absorption efficiency of the second wavelength conversion material particles 13*r* is higher than that of the first wavelength conversion material particles 13*g* in the most wavelength band. Therefore, when the first wavelength conversion material particles 13*g*, more than the second wavelength conversion material particles 13*r*, are dispersed in the wavelength conversion layer 13, the amount of the first light LG converted by the first wavelength conversion material particles 13*g* may be the same as the amount of the second light LR converted by the second wavelength conversion material particles 13*r*.

The wavelength conversion material particles may have different light absorption efficiencies depending on the wavelength of incident light. However, the wavelength conversion material particles may absorb a larger amount of light when light of a short wavelength band is incident.

For example, in the first curve WC-G, comparing a wavelength of about 400 nm with a wavelength of about 450 nm, the absorption rate 400 G at a wavelength of about 400 nm is higher than the absorption rate 450 G at a wavelength of about 450 nm. That is, in the case where light having a wavelength of about 400 nm and light having a wavelength of about 450 nm are incident in the same amount of light, when light having a wavelength of about 400 nm is incident, a larger amount of light may be absorbed, wavelength-converted and emitted compared to when light having a wavelength of about 450 nm is incident.

In an exemplary embodiment, the absorption rate 400 G at a wavelength of about 400 nm may be about 1.5 to 2.5 times the absorption rate 450 G at a wavelength of about 450 nm, but the invention is not limited thereto. The light having a wavelength of 400 nm may be near-ultraviolet light having a peak wavelength of about 390 nm to about 410 nm, and the light having a wavelength of about 450 nm may be blue light having a peak wavelength of about 430 nm to about 470 nm. That, the light absorption efficiency when near-ultraviolet light is incident on the first wavelength conversion material particles 13*g* may be higher than the light absorption efficiency when blue light is incident on the first wavelength conversion material particles 13*g*.

In other words, in the case where the light incident on the wavelength conversion layer 13 is near-ultraviolet light, even when a smaller amount of light is incident compared to when blue light is incident, the same amount of light as that in the case where blue light is incident may be emitted. That is, the power consumption of the backlight unit for generating incident light can be reduced.

Referring to FIGS. 1 and 2 again, the first protective layer 14 is disposed on the first low refractive layer 12 and the wavelength conversion layer 13. The first protective layer 14 serves to prevent the permeation of impurities such as moisture or oxygen. The first protective layer 14 may include an inorganic material. For example, the first protective layer 14 may include silicon nitride, aluminum nitride, zirconium nitride, titanium nitride, hafnium nitride, tantalum nitride, silicon oxide, aluminum oxide, titanium oxide, tin oxide, cerium oxide, or silicon oxynitride, or may include a metal thin film having light transmittance. In an exemplary embodiment, the first protective layer 14 may be made of silicon nitride.

The first protective layer 14 may completely cover the first low refractive layer 12 and the wavelength conversion layer 13 on at least one side surface thereof. In an exemplary embodiment, the first protective layer 14 may completely cover the first low refractive layer 12 and the wavelength conversion layer 13 on all side surfaces thereof, but the invention is not limited thereto. In some exemplary embodiments, the first low refractive layer 12 and the wavelength conversion layer 13 may be exposed to the outside without being covered by the first protective layer 14 on at least one side surface. When one side surface of the first low refractive layer 12 and the wavelength conversion layer 13 is exposed, they can be protected from the permeation of impurities by another protective member.

The first protective layer 14 completely overlaps the wavelength conversion layer 13, covers the upper surface of the wavelength conversion layer 13, and extends further outwardly therefrom to cover the side surface of the wavelength conversion layer 13 and the side surface of the first low refractive layer 12. The first protective layer 14 may be in contact with the upper surface and side surface of the wavelength conversion layer 13 and the side surface of the first low refractive layer 12. The first protective layer 14 extends to the upper surface 11a of the edge of the first light guide plate 11 exposed by the first low refractive layer 12 to allow a part of the edge of the first protective layer 14 to be in direct contact with the upper surface 11a of the first light guide plate 11. In an exemplary embodiment, the side surface of the first protective layer 14 may be aligned with the side surface of the first light guide plate 11.

The thickness of the first protective layer 14 may be smaller than that of the wavelength conversion layer 13, and may be similar to or smaller than that of the first low refractive layer 12. The thickness of the first protective layer 14 may be about 0.1 μm to about 2 μm. When the thickness of the first protective layer 14 is about 0.1 μm or more, the first protective layer 14 can exhibit significantly prevent permeation of impurities, and when the thickness thereof is about 0.3 μm or more, the first protective layer 14 can effectively prevent permeation of impurities. The first protective layer 14 having a thickness of about 2 μm or less is advantageous in terms of thinning and transmittance. In an exemplary embodiment, the thickness of the first protective layer 14 may be about 0.4 μm.

The wavelength conversion material particles included in the wavelength conversion layer 13 are vulnerable to impurities such as moisture or oxygen. In the case of a wavelength conversion film, barrier films are laminated on the upper and lower surfaces of the wavelength conversion layer 13 to prevent the permeation of impurities. However, as in this exemplary embodiment, when the wavelength conversion layer 13 is continuously formed without being provided in the form of a wavelength conversion film, the first protective layer 14 and the first light guide plate 11 implement a sealing structure to significantly reduce or prevent the permeation of impurities into the wavelength conversion layer 13.

The path through which moisture can infiltrate the wavelength conversion layer 13 is the upper surface, side surface and lower surface of the wavelength conversion layer 13. As described above, since the upper surface and side surface of the wavelength conversion layer 13 are covered and protected by the first protective layer 14, the permeation of impurities can be prevented or at least reduced.

Meanwhile, the lower surface of the wavelength conversion layer 13 is in contact with the upper surface of the first low refractive layer 12. In this case, when the first low refractive layer 12 includes voids or is made of an organic material, moisture can move in the first low refractive layer 12, so that the permeation of impurities into the lower surface of the wavelength conversion layer 13 can be conducted. However, in this exemplary embodiment, a sealing structure is provided even in the case of the first low refractive layer 12, so that the permeation of impurities through the side surface of the first low refractive layer 12 can be basically prevented.

Specifically, since the side surface of the first low refractive layer 12 is covered and protected by the first protective layer 14, the permeation of impurities through the side surface of the first low refractive layer 12 can be reduced. Even if the first low refractive layer 12 protrudes from the wavelength conversion layer 13 to expose a part of the upper surface thereof, the corresponding portion is covered and protected by the first protective layer 14, and thus the permeation of impurities therethrough can also be reduced. The lower surface of the first low refractive layer 12 is in contact with the first light guide plate 11. When the first light guide plate 11 is made of an inorganic material such as glass or the like, the permeation of impurities can be reduced, like the first protective layer 14. As a result, since the surface of a laminate of the first low refractive layer 12 and the wavelength conversion layer 13 is surrounded and sealed by the first protective layer 14 and the first light guide plate 11, even when an impurity movement path is provided inside the first low refractive layer 12, the impurity permeation itself can be reduced by the sealing structure, and thus the deterioration of wavelength conversion particles can be prevented or reduced.

The first protective layer 14 may be formed by a method such as vapor deposition. For example, the first protective layer 14 may be formed on the first light guide plate 11, on which the first low refractive layer 12 and the wavelength conversion layer 13 are sequentially formed, by using chemical vapor deposition. However, the invention is not limited thereto, and various other lamination methods may be used.

As described above, the first optical member 10 may perform both a light guide function and a wavelength conversion function with an integrated single member. The integrated single member may simplify an assembly process of the display device. Further, the first low refractive layer 12 is disposed on the upper surface 11a of the first light guide plate 11 of the first optical member 10 to allow total reflection to be effectively performed on the upper surface 11a of the first light guide plate 11, and the first low refractive layer 12 and the wavelength conversion layer 13 are sealed with the first protective layer 14 or the like to prevent the deterioration of the wavelength conversion layer 13.

The second optical member 20 may be disposed over the first optical member 10. The second optical member 20 may include a second light guide plate 21, a second low refractive layer 22 disposed on the second light guide plate 21, and a second protective layer 24 disposed on the second low refractive layer 22. The second optical member 20 may further include a second scattering pattern 25 disposed on the lower surface 21b of the second light guide plate 21.

The second optical member 20 may be substantially the same as the first optical member 10 except that the second optical member 20 does not include the wavelength conversion layer 13. That is, the components of the second optical member 20 may be the same as or similar to the components of the first optical member 10.

The second light guide plate 21 serves to guide the traveling path of light. The second light guide plate 21 may have a substantially polygonal columnar shape. The planar shape of the second light guide plate 21 may be rectangular, but is not limited thereto. In an exemplary embodiment, the second light guide plate 21 may have a hexagonal columnar shape with a rectangular planar shape, and the hexagonal columnar shape may include an upper surface 21a, a lower surface 21b, and four side surfaces 21S1, 21S2, 21S3, and 21S4. In the specification and the accompanying drawings, when it is necessary to distinguish the four side surfaces from each other, they are marked as "21S1", "21S2", "21S3", and "21S4", respectively, but in the case of simply referring to a side surface, it is marked as "21s".

Although it is shown in the drawings that the area and thickness of the second light guide plate 21 are substantially the same as those of the first light guide plate 11, the invention is not limited thereto. The planar area and cross-sectional thickness of the second light guide plate 21 may be larger or smaller than those of the first light guide plate 11.

The second scattering pattern 25 may be disposed on the lower surface 21b of the second light guide plate 21. The second scattering pattern 25 serves to change the traveling angle of light in the second light guide plate 21 using total reflection and emit the light to the outside of the second light guide plate 21.

In an exemplary embodiment, the second scattering pattern 25 may be provided as a separate layer or pattern. For example, a pattern layer including a protruding pattern and/or a concave groove pattern is formed on the lower surface 11b of the second light guide plate 21, or a print pattern is formed thereon, so as to allow the pattern layer or the print pattern to function as the second scattering pattern 25. In another exemplary embodiment, the second scattering pattern 25 may be formed to have a surface shape of the second light guide plate 21 itself. The arrangement density of the second scattering pattern 25 may differ depending on a region. In another exemplary embodiment, the second scattering pattern 25 may be omitted. When the second light guide plate 21 is disposed to be in contact with the first optical member 10 or the optical filter 30, the second scattering pattern 25 may be omitted without being formed.

The second light guide plate 21 may include an inorganic material. For example, the second light guide plate 21 may be made of glass, but the invention is not limited thereto.

The backlight unit 100 may include a second light source 50 disposed to face one side surface of the second light guide plate 21.

The second light source 50 may be disposed adjacent to at least one side surface 11s of the second light guide plate 21. In the drawings, there is exemplified a case where a printed circuit board 51 and a plurality of second light emitting elements 52 mounted on the printed circuit board 51 are disposed adjacent to the side surface 21S1 located at one long side of the second light guide plate 21, but the invention is not limited thereto. For example, the plurality of second light emitting elements 52 may be disposed adjacent to all sides surfaces 21S1 and 21S3 of both short sides of the second light guide plate 21, or may be disposed adjacent to sides surfaces 21S2 and 21S4 of one short side or both short sides of the second light guide plate 21.7

The second light emitting element 52 may emit near-ultraviolet light. That is, the light emitted from the second light emitting element 52 may be light having a wavelength band shorter than that of light having a blue wavelength band. In an exemplary embodiment, the near-ultraviolet light emitted from the second light emitting element 52 may be light having a peak wavelength of about 390 nm to about 510 nm. The near-ultraviolet light emitted from the second light emitting element 52 may enter the inside of the second light guide plate 21 through the light facing surface 21S1.

The second light emitting element 52 may emit blue light. That is, the light emitted from the second light emitting element 52 may be light having a blue wavelength band. In an exemplary embodiment, the blue light emitted from the second light emitting element 52 may be light having a peak wavelength of about 430 nm to about 470 nm. The blue light emitted from the second light emitting element 52 may enter the inside of the second light guide plate 21 through the light facing surface 21S1.

The second low refractive layer 22 is disposed on the upper surface 21a of the second light guide plate 21. The second low refractive layer 22 may be formed directly on the upper surface 21a of the second light guide plate 21 to be in contact with the upper surface 21a of the second light guide plate 21. The second low refractive layer 22 is disposed on the second light guide plate 21 to help the total reflection of the second light guide plate 21.

The difference in refractive index between the second light guide plate 21 and the second low refractive layer 22 may be about 0.2 or more. When the refractive index of the second low refractive layer 22 is smaller than the refractive index of the second light guide plate 21 by about 0.2 or more, sufficient total reflection can be performed through the upper surface 21a of the second light guide plate 21. The upper limit of the difference in refractive index between the second light guide plate 21 and the second low refractive layer 22 is not particularly limited, but may be about 0.5 or less in consideration of the refractive indexes of the generally-used second light guide plate 21 and second low refractive layer 22.

The refractive index of the second low refractive layer 22 may be in a range of about 1.2 to about 1.4. Generally, as the refractive index of a solid medium is close to 1, the manufacturing cost thereof exponentially increases. When the refractive index of the second low refractive layer 22 is about 1.2 or more, an excessive increase in manufacturing cost can be prevented. Further, when the refractive index of the second low refractive layer 22 is about 1.4 or less, it is advantageous to sufficiently decrease the total reflection critical angle of the upper surface 21a of the second light guide plate 21. In an exemplary embodiment, a second low refractive layer 22 having a refractive index of about 1.25 may be applied.

The second low refractive layer 22 may include voids to exhibit the above-mentioned low refractive index. The voids may be formed in a vacuum, or may be filled with an air layer, gas, or the like. The void space may be defined by particles, matrices, or the like.

The thickness of the second low refractive layer 22 may be about 0.4 μm to about 2 μm. When the thickness of the second low refractive layer 22 is about 0.4 μm or more, which is a visible light wavelength range, an effective optical interface may be formed together with the upper surface 21a of the second light guide plate 21, so that the total reflection according to Snell's law may be performed effectively on the upper surface 21a of the second light guide plate 21. When the second low refractive layer 22 is too thick, the thickness of the second optical member 20 increases, material costs increase, and is disadvantageous in terms of luminance characteristics, so that the second low refractive layer 22 may be formed to have a thickness of about 2 µm or less.

In an exemplary embodiment, the second low refractive layer 22 covers most of the upper surface 21a of the second light guide plate 21, and may expose a part of the edge of the second light guide plate 21. In other words, the side surface 21s of the second light guide plate 21 may protrude with respect to the side surface 22s of the second low refractive layer 22. The upper surface 21a of the second light guide plate 21 to which the second low refractive layer 22 is exposed provides a space in which the side surface 22s of the second low refractive layer 22 may be stably covered by the second protective layer 24.

In another exemplary embodiment, the second low refractive layer 22 may cover the entire upper surface 21a of the second light guide plate 21. The side surfaces of the second low refractive layer 22 may be aligned with the respective side surfaces of the second light guide plate 21. The difference between these exemplary embodiments may be due to the manufacturing process of the second light guide plate 21.

The second low refractive layer 22 may be formed by a method such as coating. For example, the second low refractive layer 22 may be formed by coating the upper surface 21a of the second light guide plate 21 with a composition for a low refractive layer and then drying and curing the composition. Examples of the coating method of the composition for a low refractive layer may include, but are not limited to, slit coating, spin coating, roll coating, spray coating, and inkjet coating. Other various lamination methods may be used.

A barrier layer may further be provided between the second low refractive layer 22 and the second light guide plate 21. The barrier layer, similarly to the second protective layer 24 to be described later, serves to prevent the permeation of impurities such as moisture and oxygen. The barrier layer may include an inorganic material. For example, the barrier layer may include silicon nitride, aluminum nitride, zirconium nitride, titanium nitride, hafnium nitride, tantalum nitride, silicon oxide, aluminum oxide, titanium oxide, tin oxide, cerium oxide, or silicon oxynitride. The barrier layer may include a metal thin film having light transmittance. The barrier layer may be made of the same material as the second protective layer 24, but the invention is not limited thereto. The barrier layer may be formed by a deposition method such as chemical vapor deposition.

The second protective layer 24 is disposed on the second low refractive layer 22. The second protective layer 24 serves to prevent the permeation of impurities such as moisture or oxygen. The second protective layer 24 may include an inorganic material. For example, the second protective layer 24 may include silicon nitride, aluminum nitride, zirconium nitride, titanium nitride, hafnium nitride, tantalum nitride, silicon oxide, aluminum oxide, titanium oxide, tin oxide, cerium oxide, or silicon oxynitride, or may include a metal thin film having light transmittance. In an exemplary embodiment, the second protective layer 24 may be made of silicon nitride.

The second protective layer 24 may completely cover the second low refractive layer 22 on at least one side surface thereof. In an exemplary embodiment, the second protective layer 24 may completely cover the second low refractive layer 22 on all side surfaces thereof, but the invention is not limited thereto. In some exemplary embodiments, the second low refractive layer 22 may be exposed to the outside without being covered by the second protective layer 24 on at least one side surface. When one side surface of the second low refractive layer 22 is exposed, the second low refractive layer 22 can be protected from the permeation of impurities by another protective member.

The thickness of the second protective layer 24 may be similar to or smaller than that of the second low refractive layer 22. The thickness of the second protective layer 24 may be about 0.1 µm to about 2 µm. When the thickness of the second protective layer 24 is about 0.1 µm or more, the second protective layer 24 can exhibit a significant impurity permeation preventing function, and when the thickness thereof is about 0.3 µm or more, the second protective layer 24 can have an effective significant impurity permeation preventing function. The second protective layer 24 having a thickness of about 2 µm or less is advantageous in terms of thinning and transmittance. In an exemplary embodiment, the thickness of the second protective layer 24 may be about 0.4 µm.

The second protective layer 24 may be formed by a method such as vapor deposition. For example, the second protective layer 24 may be formed on the second light guide plate 21, on which the second low refractive layer 22 is formed, by using chemical vapor deposition. However, the invention is not limited thereto, and various other lamination methods may be used.

The second optical member 20, similarly to the first optical member 10, may perform a light guide function with an integrated single member. The integrated single member may simplify an assembly process of the display device.

The optical filter 30 may be disposed between the first optical member 10 and the second optical member 20. The optical filter 30 may be a filter that transmits light of a specific wavelength band but reflects the other light without transmitting light. For example, the optical filter 30 may transmit light of a long wavelength and reflect light of a short wavelength. The optical characteristics of the optical filter 30 will be described with reference to FIG. 8.

Figure 8:
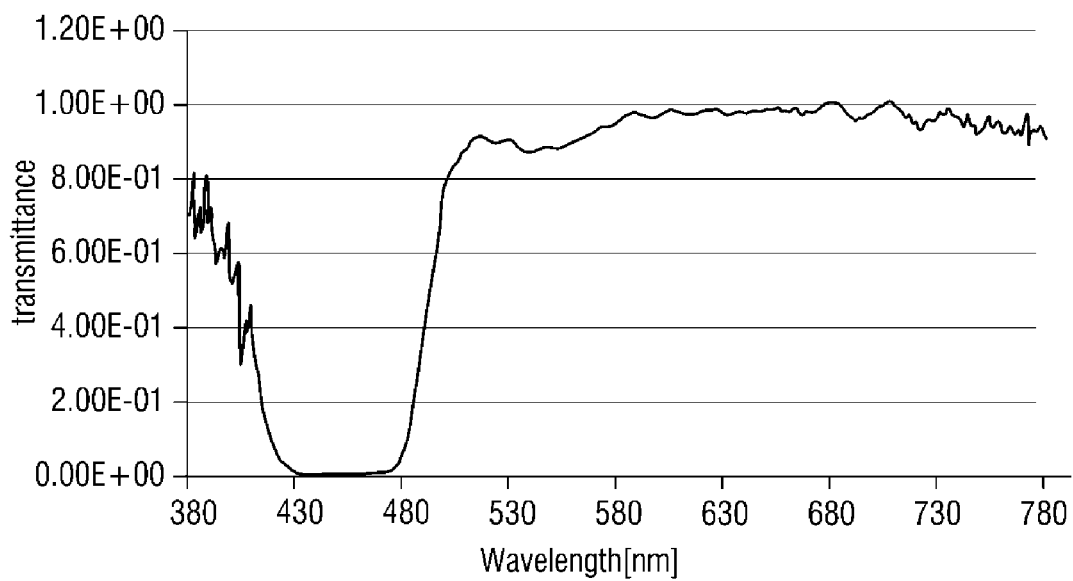
FIG. 8 is a graph schematically showing the transmittance of an optical filter constructed according to an exemplary embodiment.

FIG. 8 is a graph schematically showing the transmittance of an optical filter constructed according to an exemplary embodiment. In the graph of FIG. 8, the x-axis indicates the wavelength of light incident on the optical filter, and the y-axis indicates the transmittance thereof. As the transmittance is closer to 1, it means that light is transmitted without being absorbed and reflected, and as the transmittance is closer to 0, it means that light is absorbed or reflected.

Referring to FIG. 8, the optical filter generally transmits light having a wavelength longer than about 480 nm, and does not transmit light having a wavelength shorter than about 480 nm. That is, the optical filter may be a long-pass filter that transmits light of a long wavelength and reflects light of a short wavelength. For example, the light having a long wavelength longer than about 480 nm may include green light having a peak wavelength of about 520 nm to about 570 nm and red light having a peak wavelength of about 620 nm to about 670 nm. The light having a short wavelength shorter than about 480 nm may be light having a peak wavelength of about 430 nm to about 470 nm. That is, the optical filter may transmit green light and red light, but may reflect blue light.

As shown in FIG. 2, when the optical filter 30 is disposed over the first optical member 10 and is disposed under the second optical member 20, the optical filter 30 may transmit green light and red light incident from the first optical member 10 toward the second optical member 20, and may reflect blue light incident from the second optical member 20 toward the second optical member 20 again.

The optical filter 30 may include an inorganic material. The optical filter 30 may be a multi-layer film in which a plurality of layers made of different inorganic materials are laminated. For example, the optical filter 30 may be a multi-layer film including at least one of silicon nitride, aluminum nitride, zirconium nitride, titanium nitride, hafnium nitride, tantalum nitride, silicon oxide, aluminum oxide, titanium oxide, tin oxide, cerium oxide, and silicon oxynitride, but is not limited thereto. The optical filter 30 is not limited as long as it includes a material and structure capable of exhibiting optical characteristics.

As described above, the optical filter 30 is disposed between the first optical member 10 and the second optical member 20. In an exemplary embodiment, the optical filter 30 may be provided as a separate filter member and attached to the first optical member 10 by an adhesive material such as optical clear resin (OCR) or optical clear adhesive (OCA). In another exemplary embodiment, the optical filter 30 may be formed directly on the first optical member 10. That is, the optical filter may be formed over the first light guide plate 11 through a continuous process. In another exemplary embodiment, the optical filter 30 may be spaced apart from the first optical member 10 and the second optical member 20 without being in contact therewith. That is, air layers may be formed between the first optical member 10 and the optical filter 30 and between the second optical member 20 and the optical filter 30.

The backlight unit 100 may further include a reflective member 60 disposed under the first optical member 10. The reflective member 60 may include a reflective film or a reflective coating layer. The reflective member 60 reflects the light emitted to the lower surface 11b of the first light guide plate 11 of the first optical member 10 and introduces the reflected light into the first light guide plate 11 again.

Figure 9:
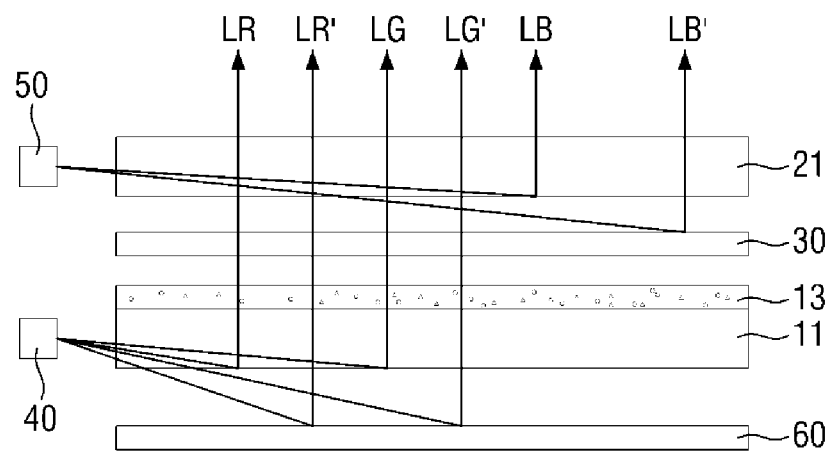
FIG. 9 is a view schematically showing the paths of light emitted from a first light source and a second light source according to an exemplary embodiment.

Referring to FIG. 9, as described above, the first light source 40 may be disposed adjacent to one side surface of the first light guide plate 11, and the second light source 50 may be disposed adjacent to one side surface of the second light guide plate 21. The first light source 40 may emit near-ultraviolet light having a peak wavelength of about 390 nm to about 410 nm, and the second light source 50 may emit blue light having a peak wavelength of about 430 nm to about 470 nm.

The near-ultraviolet light emitted from the first light source 40 may be emitted in various directions. In the near-ultraviolet light, the light emitted to the lower surface of the first light guide plate 11 may be reflected upward from the lower surface of the first light guide plate 11. The light that is not reflected upward from the lower surface of the first light guide plate 11 may be reflected upward by the reflective member 60 disposed below the first light guide plate 11.

For example, in the near-ultraviolet light emitted from the first light source 40, the light reflected upward from the lower surface of the first light guide plate 11 may be transmitted through the wavelength conversion layer 13 to be converted into first red light LR and first green light LG, and the first red light LR and the first green light LG may be emitted to the outside. A part of the light transmitted through the first light guide plate 11 without being reflected by the lower surface of the first light guide plate 11 may be reflected upward by the reflective member 60. The light reflected upward by the reflective member 60 may be transmitted through the wavelength conversion layer 13 to be converted into second red light LR' and second green light LG', and the second red light LR' and the second green light LG' may be emitted to the outside. The aforementioned red light LR and LR' and green light LG and LG' may be transmitted without being reflected even though they pass through the optical filter 30.

Further, the blue light emitted from the second light source 50 may be emitted in various directions. In the blue light, the light emitted to the lower surface of the second light guide plate 21 may be reflected upward from the lower surface of the second light guide plate 21. The light that is not reflected upward from the lower surface of the second light guide plate 21 may be reflected upward by the optical filter 30 disposed below the second light guide plate 21.

For example, in the blue light emitted from the second light source 50, the light reflected upward from the lower surface of the second light guide plate 21 may be emitted to the outside as first blue light LB. A part of the light transmitted through the second light guide plate 21 without being reflected by the lower surface of the second light guide plate 21 may be reflected upward by the optical filter 30. As described above, the optical filter 30 may transmit is light of a long wavelength such as red light and green light, and may reflect light of a short wavelength such as blue light. The light reflected upward by the optical filter 30 may also be emitted to the outside as second blue light LB'.

Consequently, the light emitted to the outside may include red light LR and LR', green light LG and LG', and blue light LB and LB'. When appropriately adjusting the ratio of the emitted light of different colors, white light or emitted light of another color can be displayed.

A conventional backlight unit has used only blue light as a light source. In the case of wavelength conversion using only blue light, the blue light transmits through the wavelength conversion layer to weaken the intensity of the blue light, and the light conversion efficiency of the wavelength conversion layer to the blue light is not high. However, as described above, the backlight unit according to this exemplary embodiment may convert the reflected light into green light and red light using near-ultraviolet light having high light conversion efficiency. Further, the blue light is not transmitted through the wavelength conversion layer, and thus light amount does not decrease. Therefore, even when both the near-ultraviolet light source and the blue light source are used, the sum of power consumptions for emitting light using the two kinds of light sources may be lower than the power consumption for emitting light using the conventional blue light source.

Hereinafter, backlight units according to other exemplary embodiments will be described. In the following exemplary embodiments, the same components as those of the previously described exemplary embodiments will be referred to by the same reference numerals, descriptions thereof will be omitted or simplified to avoid redundancy, and differences will be mainly described.

Figure 10:
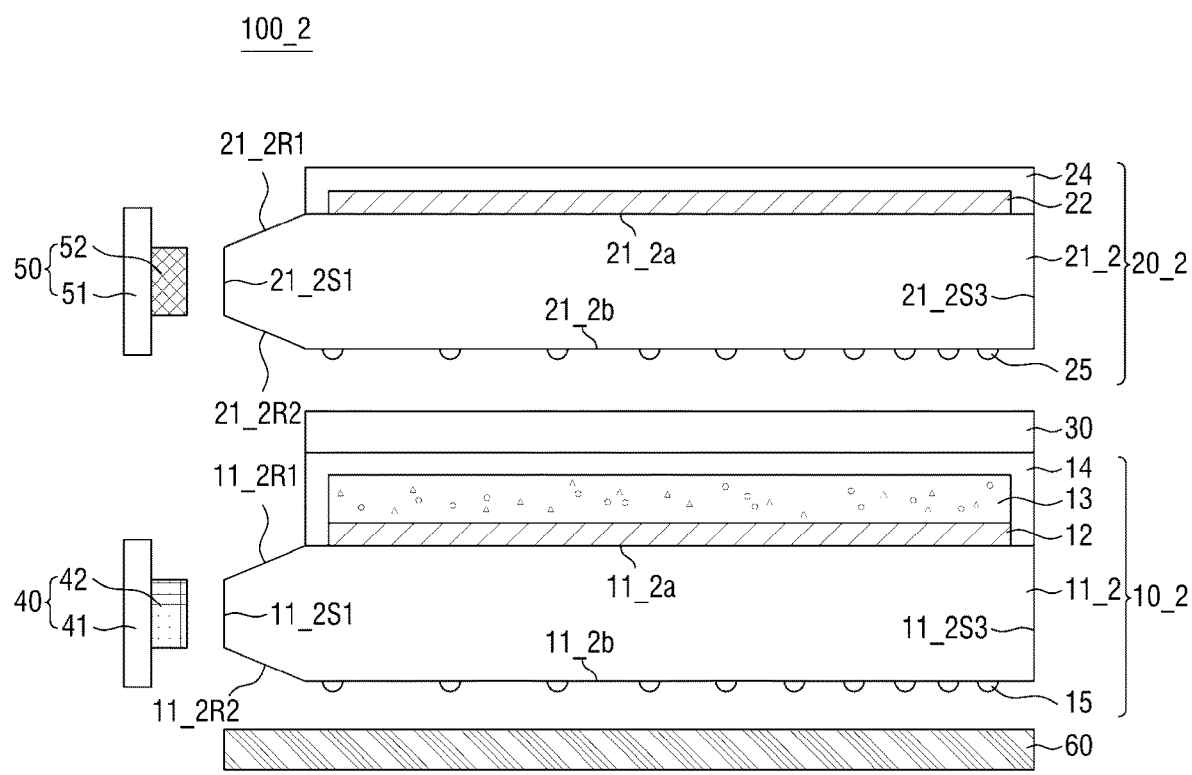
FIGS. 10, 11, and 12 are cross-sectional views of backlight units constructed according to other exemplary embodiments.
Figure 11:
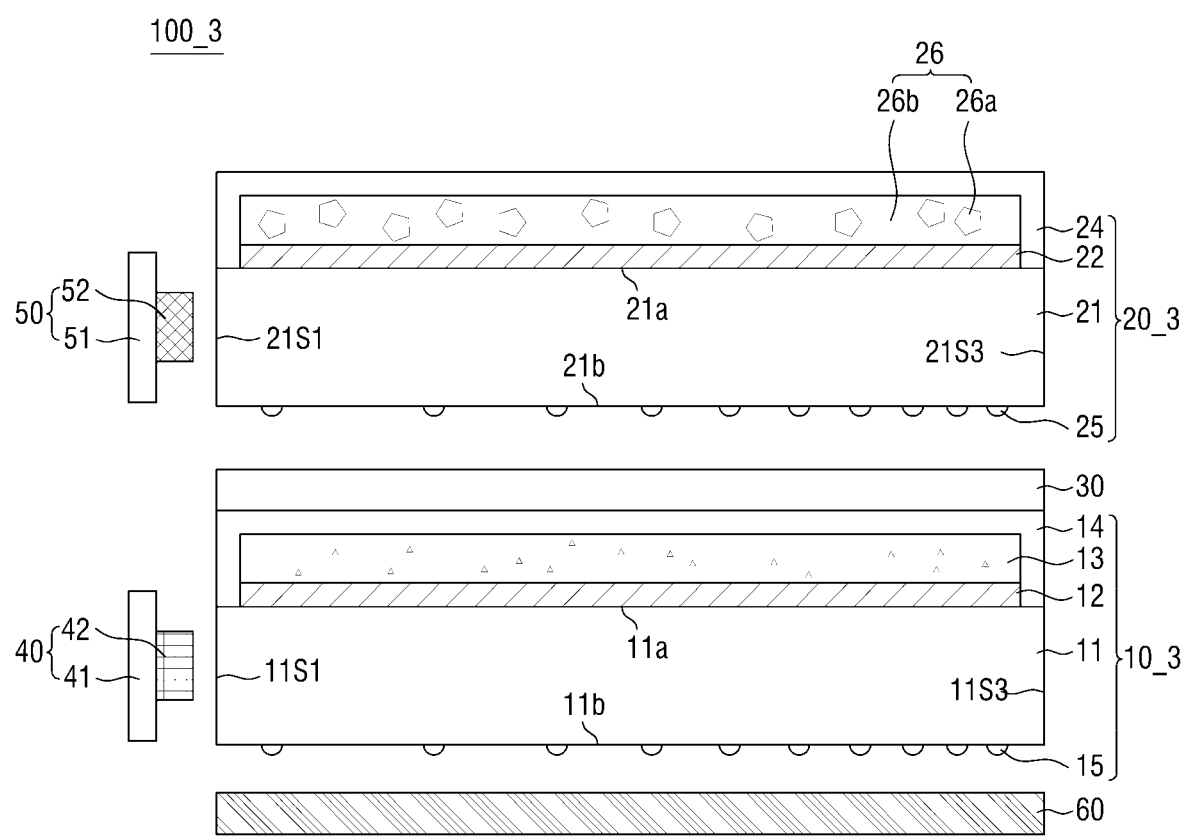
Figure 12:
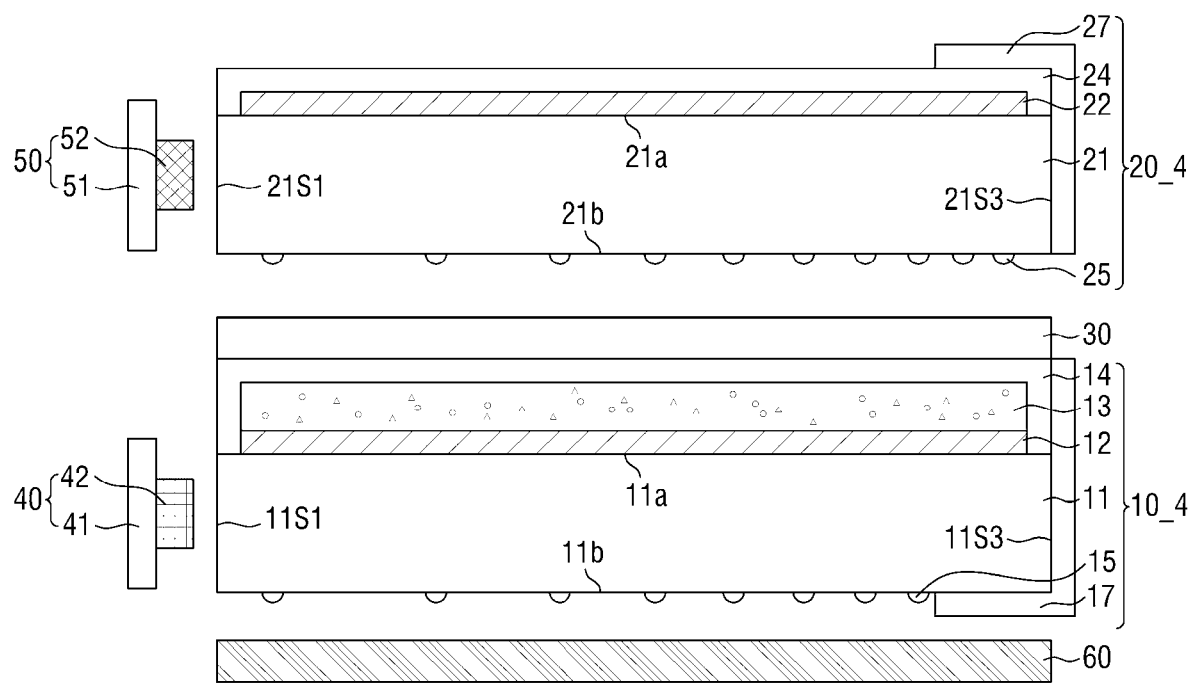

FIGS. 10 to 12 are cross-sectional views of backlight units constructed according to other exemplary embodiments.

The exemplary embodiment of FIG. 10 is different from the exemplary embodiment of FIG. 2 in that the first light guide plate and the second light guide plate include inclined edge surfaces.

Referring to FIG. 10, a backlight unit 100_2 includes a first optical member 10_2, a second optical member 20_2 disposed over the first optical member 10_2, and light sources 40 and 50 disposed adjacent to the side surfaces of the respective optical members 10_2 and 20_2. The backlight unit 100_2 may further include an optical filter 30 disposed between the first optical member 10_2 and the second optical member 20_2 and a reflective member 60 disposed under the first optical member 10_2.

The first optical member 10_2 includes a first light guide plate 11_2 and guides near-ultraviolet light incident from the first light source 40 toward a light incidence surface 11_2S1 toward a light incidence surface 11_2S3.

The first light guide plate 11_2 may further include first inclined edge surfaces 11_2R1 and 11_2R2 between the upper surface 11_2a and the side surface 11S and/or between the lower surface 11_2b and the side surface 11S. The upper surface 11_2a of the first light guide plate 11_2 meets one side of the first upper edge surface 11_2R1, and the side surface 11_2S of the first light guide plate 11_2 meets the other side of the first upper edge surface 11_2R1. Further, the lower surface 11_2b of the first light guide plate 11_2 meets one side of the first lower edge surface 11_2R2, and the side surface 11_2S of the first light guide plate 11_2 meets the other side of the first lower edge surface 11_2R2. The first upper edge surface 11_2R1 and the first lower edge surface 11_2R2 are inclined with respect to the upper surface 11_2a and side surface 11_2s of the first light guide plate 11_2 and with respect to the lower surface 11_2b and side surface 11_2s of the first light guide plate 11_2. The inclination angles of the first upper edge surface 11_2R1 and the first lower edge surface 11_2R2 with respect to the upper surface 11_2a and lower surface 11_2b of the first light guide plate 11_2 may be about 6° to about 20°.

The second optical member 20_2 includes a second light guide plate 21_2 and guides blue light incident from the second light source 50 toward a light incidence surface 21_2S1 toward a light incidence surface 21_2S3.

The second light guide plate 21_2 may further include second inclined edge surfaces 21_2R1 and 21_2R2 between the upper surface 21_2a and the side surface 21S and/or between the lower surface 21_2b and the side surface 21S. The upper surface 21_2a of the second light guide plate 21_2 meets one side of the second upper edge surface 21_2R1, and the side surface 21_2S of the second light guide plate 21_2 meets the other side of the second upper edge surface 21_2R1. Further, the lower surface 21_2b of the second light guide plate 21_2 meets one side of the second lower edge surface 21_2R2, and the side surface 21_2S of the second light guide plate 21_2 meets the other side of the second lower edge surface 21_2R2. The second upper edge surface 21_2R1 and the second lower edge surface 21_2R2 are inclined with respect to the upper surface 21_2a and side surface 21_2s of the second light guide plate 21_2 and with respect to the lower surface 21_2b and side surface 21_2s of the second light guide plate 21_2. The inclination angles of the second upper edge surface 21_2R1 and the second lower edge surface 21_2R2 with respect to the upper surface 21_2a and lower surface 21_2b of the second light guide plate 21_2 may be about 6° to about 20°.

The first edge surfaces 11_2R1 and 11_2R2 and the second edge surfaces 21_2R1 and 21_2R2 may serve to relax the sharpness of the edge portions of the first light guide plate 11_2 and the second light guide plate 21_2 to prevent breakage due to an external impact. Moreover, the first edge surfaces 11_2R1 and 11_2R2 and the second edge surfaces 21_2R1 and 21_2R2 adjust the travelling path of light from the light incidence surface 11_2S1 of the first light guide plate 11_2 and the light incidence surface 21_2S1 of the second light guide plate 21_2, so as to effectively perform total reflection in the first light guide plate 11_2 and the second light guide plate 21_2 and prevent a light leakage phenomenon. The first corner surfaces 11_2R1 and 11_2R2 and the second corner surfaces 21_2R1 and 21_2R2 may be planar, but may also be curved.

The exemplary embodiment of FIG. 11 is different from the exemplary embodiment of FIG. 2 in that the second optical member includes an upper wavelength conversion layer including wavelength conversion material particles. The exemplary embodiment of FIG. 11 will be described in conjunction with FIG. 5 which explains the wavelength conversion layer.

Referring to FIGS. 5 and 11, a backlight unit 100_3 includes a first optical member 10_3 including an lower wavelength conversion layer 13, and a second optical member 20_3 disposed over the first optical member 10_3 and including an upper wavelength conversion layer 26. The backlight unit 100_3 may further include an optical filter 30 disposed between the first optical member 10_3 and the second optical member 20_3 and a reflective member 60 disposed under the first optical member 10_3.

The first optical member 10_3 may include a lower wavelength conversion layer 13. The lower wavelength conversion layer 13 includes the first wavelength conversion material particles ("13g" in FIG. 5), but may not include the second wavelength conversion material particle ("13r" in FIG. 5). That is, the lower wavelength conversion layer 13 may convert incident light only into the first light ("LG" in FIG. 5). For example, the first light LG is green light, and the lower wavelength conversion layer 13 may include only the first wavelength conversion material particles 13g to convert incident light only into green light.

The second optical member 20_3 may include an upper wavelength conversion layer 26. The upper wavelength conversion layer 26 may include third wavelength conversion material particles 26a and a binder layer 26b.

The binder layer 26b is a medium in which the third wavelength conversion material particles 26a are dispersed, and may be composed of various resin compositions generally referred to as a binder. However, the invention is not limited thereto. The medium may be referred to as a binder layer 26b regardless of its name, other additional functions, constituent materials, and the like, as long as it can disperse the wave conversion particles and/or the scattering particles.

The third wavelength conversion material particles 26a are particles for converting the wavelength of incident light, and may be, for example, quantum dots (QD), fluorescent material particles, or phosphorescent material particles. In an exemplary embodiment, the third wavelength conversion material particles 26a may be red fluorescent material particles. The red fluorescent material particles may absorb incident light and emit it as red light. The red fluorescent material particles may be larger in size than the wavelength converting material particles included in the lower wavelength conversion layer 13. That is, the upper wavelength conversion layer 26 including the red fluorescent material particles may be thicker than the lower wavelength conversion layer 13. In another exemplary embodiment, the third wavelength conversion material particles 26a may be quantum dots. In particular, the third wavelength conversion material particles 26a, similarly to the second wavelength conversion material particles ("13r" in FIG. 5), may be quantum dots that absorb incident light and emit it as red light. The third wavelength conversion material particles 26a are limited to the above exemplary embodiments as long as they can absorb incident light and emit it as red light.

A part of the near-ultraviolet light emitted from the first light source 40 may be transmitted through the lower wavelength conversion layer 13, converted into green light, and then emitted. A part of the blue light emitted from the second light source 50 may be transmitted through the upper wavelength conversion layer 26, converted into red light, and then emitted, and then emitted, and another part thereof may be emitted to the outside without reacting with the third wavelength conversion material particles 26a. That is, the light emitted to the outside from the backlight unit 100_3 may include red light, green light, and blue light. When appropriately adjusting the ratio of the emitted light of different colors, white light or emitted light of another color can be displayed.

The green light conversion efficiency can be increased by transmitting near-ultraviolet light through only the first wavelength conversion material particles 13g having low light conversion efficiency attributable to blue light, and the color coordinates of the light emitted from the backlight unit 100_3 can be adjusted by controlling the ratio of red light and blue light using the third wavelength conversion material particles 26a disposed in the upper wavelength conversion layer 26.

The exemplary embodiment of FIG. 12 is different from the exemplary embodiment of FIG. 2 in that the first optical member and the second optical member include tape members on light facing surfaces thereof.

Referring to FIG. 12, a backlight unit 100_4 includes a first optical member 10_4, a second optical member 20_4 disposed over the first optical member 10_4, and light sources 40 and 50 disposed adjacent to the respective first and second optical members 10_4 and 20_4. The backlight unit 100_4 may further include an optical filter 30 disposed between the first optical member 10_4 and the second optical member 20_4 and a reflective member 60 disposed under the first optical member 10_4.

The first optical member 10_4 may further include a first tape member 17 disposed on the light facing surface 11S3 of the first light guide plate 11.

The first tape member 17 may be disposed to cover the light facing surface 11S3 of the first light guide plate 11, and may be disposed to further cover the lower surface 11b of the first light guide plate 11. In an exemplary embodiment, the first tape member 17 may be a sealing tape for protecting the wavelength conversion layer 13. The first tape member 17 is disposed so as to cover the side surface of the first optical member 10_4 to prevent moisture and oxygen from permeating into the wavelength conversion layer 13. When the wavelength conversion layer 13 is not protected by the first protective layer 14, the wavelength conversion layer 13 can be protected through the first tape member 17. Even when the wavelength conversion layer 13 is protected by the first protective layer 14, the first tape member 17 can prevent the permeation of moisture and oxygen through cracks that may occur between the first light guide plate 11 and the first protective layer 14.

In another exemplary embodiment, the first tape member 17 may be a reflective tape for preventing light leakage on the light facing surface 11S3. The first tape member 17 can prevent incident light from leaking toward the light facing surface 11S3 in the process of guiding the light incident on the light incidence surface 11S1 toward the light facing surface 11S3 by the first light guide plate 11. That is, when the first tape member 17 is disposed so as to cover the light facing surface 11S3, it is possible to prevent or reduce the light leakage phenomenon that may occur at the edge side of the backlight unit 100_4. The first tape member 17 may further include a light reflecting material on the attachment surface thereof, so as to reflect the light incident on the first tape member 17. For example, the light reflecting material may include silver (Ag). The light reflecting material may be deposited or applied directly on the attachment surface of the first tape member 17. The reflective tape on which Ag is deposited can reflect light in all wavelength bands. As another example, the first tape member 17 may have a structure in which a plurality of layer having different refractive indexes are laminated, like a reflective polarizing film, not a light reflecting material.

Figure 13:
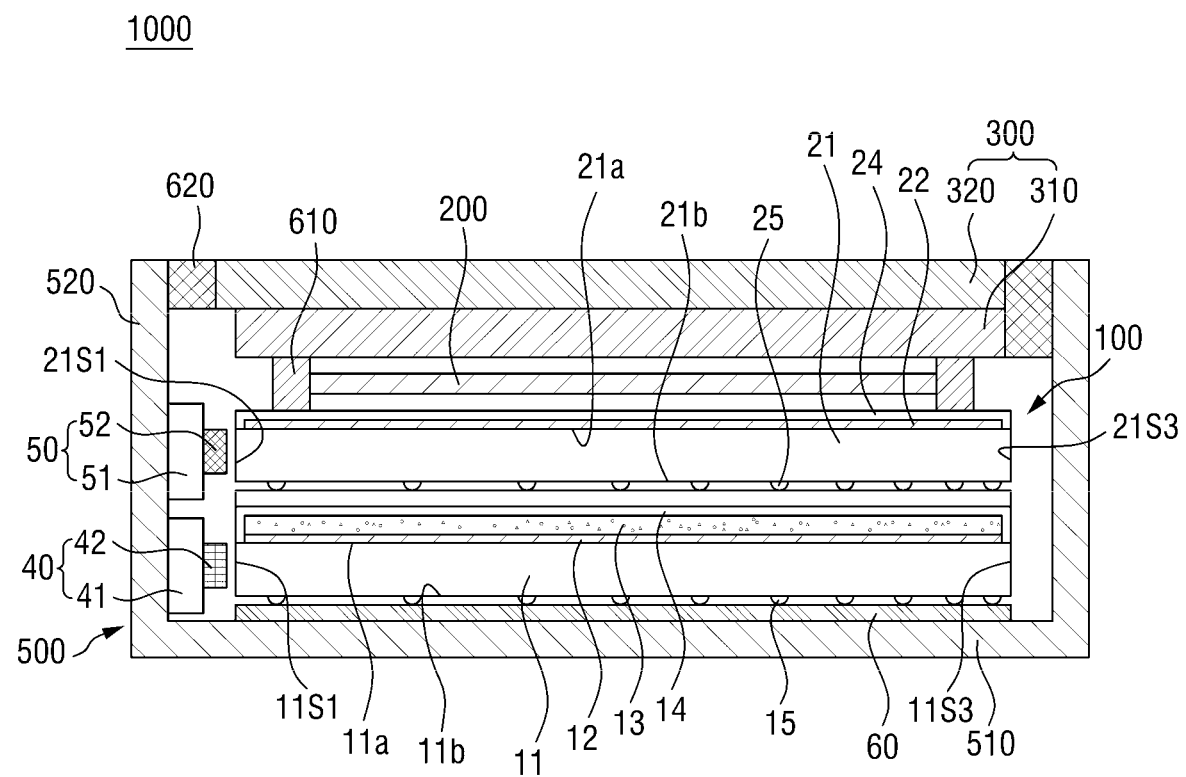
FIG. 13 is a cross-sectional view of an exemplary embodiment of a display device constructed according to the principles of the invention.

FIG. 13 is a cross-sectional view of an exemplary embodiment of a display device constructed according to an the principles of the invention. The display device 1000 of FIG. 13 may include the backlight unit 100 having been described with reference to FIGS. 1 and 2. The backlight unit 100 disposed inside the display device is only one example, and is not limited thereto. The aforementioned optical members of all the exemplary embodiments may be applied to this exemplary embodiment.

Referring to FIG. 13, the display device 1000 includes a backlight unit 100 and a display panel 300 disposed over the backlight unit 100. The display device 1000 may further include an optical film 200 disposed between the backlight unit 100 and the display panel 300.

The display panel 300 is disposed over the backlight unit 100. The display panel 300 receives light from the backlight unit 100 and displays an image. Examples of the light-receiving display panel receiving light and displaying an image may include a liquid crystal display panel and an electrophoretic display panel. Hereinafter, a liquid crystal display panel is exemplified as the display panel, but various other light-receiving display panels may be applied without being limited thereto.

The display panel 300 may include a first substrate 310, a second substrate 320 facing the first substrate 310, and a liquid crystal layer disposed between the first substrate 310 and the second substrate 320. The first substrate 310 and the second substrate 320 may overlap each other. In an exemplary embodiment, any one of the substrates may be larger than the other substrate and thus protrude further outward. In the drawings, there is illustrated a case where the overlying second substrate 320 is larger than the underlying first substrate 310 and protrudes from a side surface where the first light source 40 and the second light source 50 are disposed. The protruding region of the second substrate 320 may provide a space for mounting a driving chip or an external circuit board. Unlike the illustrated example, the underlying first substrate 310 may be larger than the overlying second substrate 320 and thus protrude outward. In the display panel 300, a region where the first substrate 310 and the second substrate 320 overlap each other, except for the protruding region, may be aligned with the side surface 11s of the first light guide plate 11 of the backlight unit 100 or the side surface 21s of the second light guide plate 21 of the backlight unit 100.

The backlight unit 100 may be coupled with the display panel 300 through an inter-module coupling member 610. The inter-module coupling member 610 may have a rectangular frame shape. The inter-module coupling member 610 may be disposed at the edges of the display panel 300 and the backlight unit 100, respectively.

In an exemplary embodiment, the lower surface of the inter-module coupling member 610 is disposed on the upper surface of the second protective layer 24 of the second optical member 20. The inter-module coupling member 610 may be disposed on second protective layer 24 such that its lower surface overlap only the upper surface of a laminate structure constituting the first optical member 10 and the second optical member 20 and does not overlap the side surface thereof.

The inter-module coupling member 610 may include a polymer resin or an adhesive tape.

In some exemplary embodiments, the inter-module coupling member 610 may further perform a function of blocking light transmission. For example, the inter-module coupling member 610 may include a light absorbing material such as a black pigment or dye, or may include a reflective material, thereby performing a function of blocking light transmission.

The display device 1000 may further include a housing 500. The housing 500 is open at one side, and includes a floor 510 and a side wall 520 connected to the floor 510. The backlight unit 100 and the display panel 300 may be accommodated in the space defined by the floor 510 and the side wall 520. The reflective member 60, first optical member 10, optical filter 30, and second optical member 20 of the backlight unit 100 are sequentially disposed on the floor 510 of the housing 500 in this order.

The display panel 300 disposed over the backlight unit 100 may be disposed adjacent to the upper end of the side wall of the housing 500, and the display panel 300 and the housing 500 may be coupled to each other by a housing coupling member 620. The housing coupling member 620 may have a rectangular frame shape. The housing coupling member 620 may include a polymer resin or an adhesive tape.

The display device 1000 may further include at least one optical film 200. One optical film 200 or a plurality of optical films 200 may be accommodated in a space surrounded by the inter-module coupling member 610 between the backlight unit 100 and the display panel 300. The side surfaces of the one optical film 200 or the plurality of optical films 200 may be in contact with the inner side surfaces of the inter-module coupling member 610 to be attached thereto. FIG. 13 illustrates the case where the optical film 200 and the backlight unit 100 are spaced apart from each other, and the optical film 200 and the display panel 300 are spaced apart from each other, respectively, but the spaces therebetween are not necessarily required.

The optical film 200 may be a prism film, a diffusion film, a micro-lens film, a lenticular film, a polarizing film, a reflective polarizing film, a retardation film, or the like. The display device 1000 may include a plurality of optical films 200 of the same kind or different kinds. When the plurality of optical films 200 are applied, the optical films 200 may be disposed to overlap each other, and the side surfaces thereof may be in contact with the inner surfaces of the inter-module coupling member 610 to be attached thereto. The optical films 200 may be spaced apart from each other, and an air layer may be disposed between the optical films 200.

In an exemplary embodiment, as the optical film 200, a composite film in which two or more optical function layers are integrated with each other may be used. Details thereof will be described with reference to FIG. 14.

Figure 14:
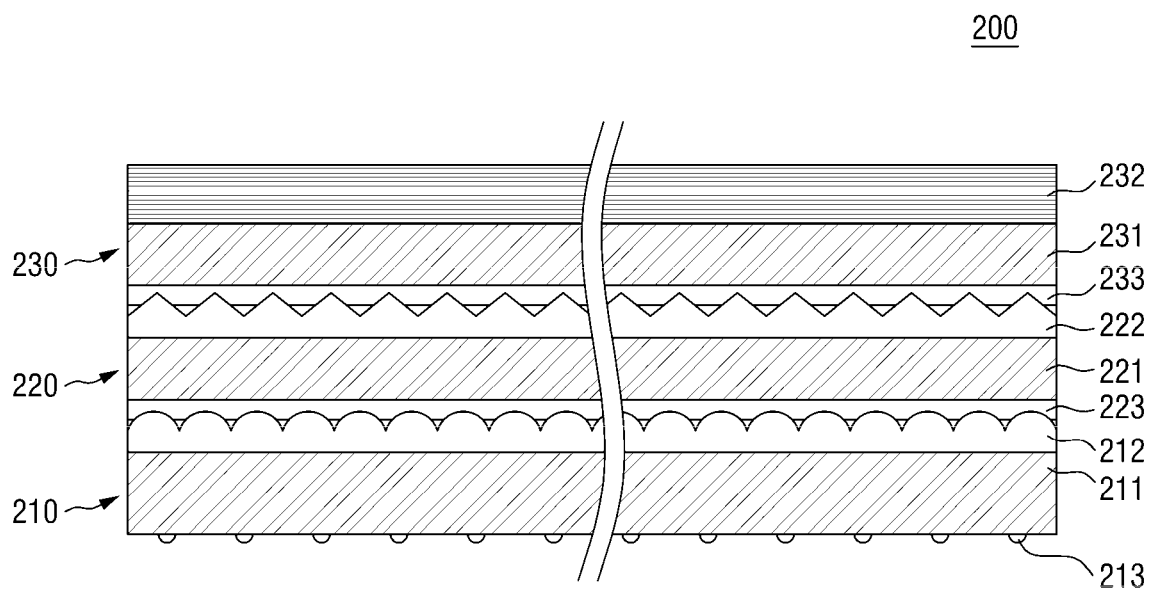
FIG. 14 is a cross-sectional view of an exemplary embodiment of an optical film constructed according to the principles of the invention.

FIG. 14 is a cross-sectional view of exemplary embodiment of an optical film constructed according to the principles of the invention. Referring to FIG. 14, an optical film 200 according to an exemplary embodiment may include a first film 210, a second film 220, and a third film 230, which are integrated with each other.

The first film 210 may include a first substrate 211, a back coating layer 213 disposed on the lower surface of the first substrate 211, and a first optical pattern layer 212 disposed on the upper surface of the first substrate 211. When the optical film 200 is disposed to be spaced apart from the backlight unit 100, the back coating layer 213 may be omitted.

The second film 220 may include a second substrate 221, a first bonding resin layer 223 disposed on the lower surface of the second substrate 221, and a second optical pattern layer 222 disposed on the upper surface of the second substrate 221.

The third film 230 may include a third substrate 231, a second bonding resin layer 233 disposed on the lower surface of the third substrate 231, and an optical layer 232 disposed on the upper surface of the third substrate 231.

The first optical pattern layer 212 includes a convex portion and a concave portion, and a part of the convex portion is in contact with or partially penetrates into the first bonding resin layer 223. An air layer is disposed between the concave portion of the first optical pattern layer 212 and the first bonding resin layer 223.

The second optical pattern layer 222 includes a convex portion and a concave portion, and a part of the convex portion is in contact with or partially penetrates into the second bonding resin layer 233. An air layer is disposed between the concave portion of the second optical pattern layer 222 and the second bonding resin layer 233.

In an exemplary embodiment, the first optical pattern layer 212 is a microlens pattern layer or a diffusion layer, the second optical pattern layer 222 is a prism pattern layer, and the optical layer 232 of the third film 230 is a reflective polarizing layer. In another exemplary embodiment, the first optical pattern layer 212 is a prism pattern layer (extending direction crosses the prism pattern of the first optical pattern layer), the second optical pattern layer 222 is a prism pattern layer, and the optical layer 232 of the third film 230 is a reflective polarizing layer. In the above exemplary embodiments, the third substrate 231 of the third film 230 may be omitted, and the second bonding resin layer 233 may be disposed on the lower surface of the optical layer 232. Besides, as the first optical pattern layer 212, the second optical pattern layer 222 and the optical layer 232, various different optical function layers may be used. Further, two films or four or more films may be integrated and applied.

Hereinafter, display devices according to other exemplary embodiments will be described. In the following exemplary embodiments, the same components as those of the previously described exemplary embodiments will be referred to by the same reference numerals, descriptions thereof will be omitted or simplified to avoid redundancy, and differences will be mainly described.

Figure 15:
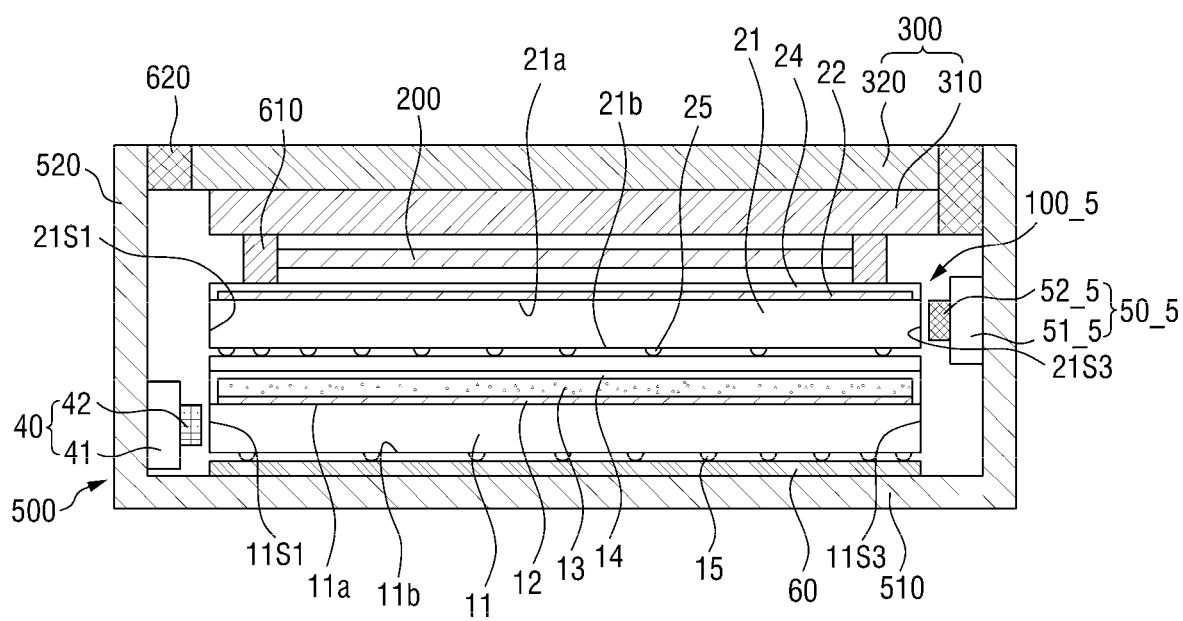
FIGS. 15 and 16 are cross-sectional views of display devices constructed according to other exemplary embodiments.
Figure 16:
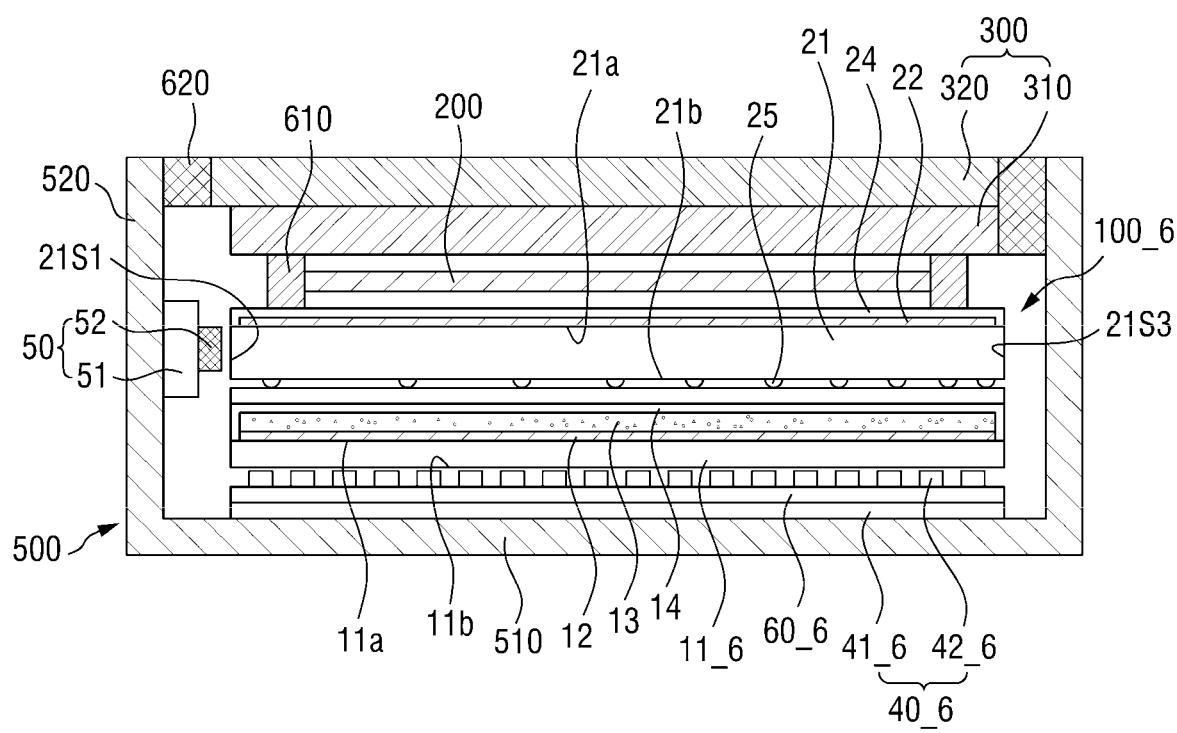

FIGS. 15 and 16 are cross-sectional views of display devices constructed according to various exemplary embodiments.

The exemplary embodiment of FIG. 15 is different from the exemplary embodiment of FIG. 13 in that the first light source is disposed adjacent to one side surface of the first optical member, and the second light source is disposed adjacent to one side surface of the second optical member facing the one side surface of the first optical member.

Referring to FIG. 15, a display device 1000_5 includes a backlight unit 100_5 and a display panel 300 disposed over the backlight unit 100_5. The backlight unit 100_5 may include a first light source 40 disposed adjacent to one side surface of the first light guide plate 11 and a second light source 50_5 disposed adjacent to one side surface of the second light guide plate 21.

The first light source 40 may be disposed adjacent to one side surface 11S1 of the first light guide plate 11. One side surface of the first light guide plate 11, on which light emitted from the first light source 40 is incident, may be a light incidence surface 11S1, and the other side surface thereof, facing the one side surface thereof, may be a light facing surface 11S3. The second light source 50_5 may be disposed adjacent to one side surface 21S3 of the second light guide plate 21. One side surface of the second light guide plate 21, on which light emitted from the second light source 50_5 is incident, may be a light incidence surface 21S3, and the other side surface thereof, facing the one side surface thereof, may be a light facing surface 21S1.

The light incidence surface 11S1 of the first light guide plate 11 and the light incidence surface 21S3 of the second light guide plate 21 may face each other. That is, the light incidence surface 11S1 of the first light guide plate 11 and the light incidence surface 21S3 of the second light guide plate 21 may be disposed on different planes. Accordingly, the first light source 40 and the second light source 50_5 may also be disposed on different sides of the backlight unit 100, and may not overlap the display panel 300 in the vertical direction. In an exemplary embodiment, the first light source 40 may be attached to the side wall 520 disposed at the left side of the housing 500 based on the drawing. The second light source 50_5 may be attached to the side wall 520 disposed at the right side of the housing 500 based on the drawing. In another exemplary embodiment, the first light source 40 may be attached to the floor 510 of the housing 500 to provide light toward the light incidence surface 11S1.

Although it is described that the first light source 40 and the second light source 50_5 are disposed to face each other, the invention is not limited thereto. For example, when the first light source 40 is disposed adjacent to one side surface 11S1 of the first light guide plate 11, the second light source 50_5 may be disposed on one side surface ("21S2, 21S4" in FIG. 1) of the second light guide plate 21 corresponding to the side surface ("11S2, 11S4" in FIG. 1) contacting the light incidence surface 11S1 of the first light guide plate 11.

When the second light source 50_5 is disposed to face the first light source 40, the second scattering pattern 25 may be disposed to be symmetrical to the first scattering pattern 15. That is, the region adjacent to the light incidence surface 21S3 of the second light guide plate 21 with a large amount of light may have low arrangement density, and the region adjacent to the light facing surface 21S1 of the second light guide plate 21 with a relatively small amount of light may have high arrangement density.

When the first light source 40 and the second light source 50_5 are disposed to face each other, the luminance uniformity of the backlight unit 100_5 can be improved.

The exemplary embodiment of FIG. 16 is different from the exemplary embodiment of FIG. 13 in that the first light source is a direct type light source disposed under the first light guide plate.

Referring to FIG. 16, a display device 1000_6 includes a backlight unit 100_6 and a display panel 300 disposed over the backlight unit 100_6. The backlight unit 100_6 may include a first light source 40_6 disposed under the first light guide plate 11_6 and a second light source 50 disposed adjacent to one side surface 21S1 of the second light guide plate 21.

The first light source 40_6 includes a printed circuit board 41_6 disposed on the floor 510 of the housing 500 and a plurality of light emitting elements 42_6 disposed on the printed circuit board 41_6 to be spaced apart from each other. A reflective member 60_6 may further be disposed between the printed circuit board 41_6 and the plurality of light emitting elements 42_6.

Each of the light emitting elements 42_6 may be an organic light emitting element that emits near-ultraviolet light. The plurality of light emitting elements 42_6 may be spaced apart from each other by a predetermined distance for luminance uniformity of the backlight unit 100_6. For example, the plurality of light emitting elements 42_6 may be arranged in a substantially matrix form at regular intervals in the horizontal and vertical directions. The plurality of light emitting elements 42_6 may be arranged in parallel to each other in the vertical direction, and may be arranged in a zigzag form in the horizontal direction. The arrangement of the light emitting elements 42_6 is not limited thereto, and may be arranged in various ways in order to obtain high luminance uniformity. The printed circuit board 41_6 may further include a fastening hole and a fastening member for arranging the light emitting elements 42_6.

The first light guide plate 11_6 may be a diffusion plate for diffusing incident light. The first light guide plate 11_6 may be disposed over the first light source 40_6 to diffuse the light emitted from the first light source 40_6. That is, the first light guide plate 11_6 may improve the luminance uniformity of the light emitted from the backlight unit 100_6. The first light guide plate 11_6 may be directly attached to the first light source 40_6 or may be spaced apart from the first light source 40_6 by a predetermined distance with an air layer therebetween.

As described above, according to the principles and exemplary embodiments of the invention, it is possible provide a backlight unit and a display device incorporating the same that are capable of reduced power consumption.

As described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A backlight unit, comprising:
a first light guide plate;
a first low refractive layer disposed directly on the first light guide plate;
a second light guide plate disposed over the first light guide plate;
a first wavelength conversion layer disposed directly on the first low refractive layer between the first light guide plate and the second light guide plate;
a first protective layer disposed directly on the first wavelength conversion layer and the first light guide plate;
a first light source disposed at a location which is lower than the first wavelength conversion layer and configured to emit a first light;
a second light source disposed adjacent to one side surface of the second light guide plate and configured to emit a second light; and
an optical filter disposed directly on the first protective layer between the first wavelength conversion layer and the second light guide plate,
wherein a wavelength of the first light is shorter than a wavelength of the second light, wherein the second light is blue light, and
wherein the optical filter is configured to reflect blue light, and to transmit green light and red light.

2. The backlight unit of claim 1, wherein the first light source is disposed adjacent to one side surface of the first light guide plate.

3. The backlight unit of claim 2,
wherein the first light source is configured to emit a first near-ultraviolet light.

4. The backlight unit of claim 3,
wherein the first low refractive layer has a lower refractive index than the first light guide plate.

5. The backlight unit of claim 4, further comprising:
a second low refractive layer and a second protective layer, both of which are disposed on the second light guide plate,
wherein the second low refractive layer is disposed between the second light guide plate and the second protective layer.

6. The backlight unit of claim 3,
wherein the first wavelength conversion layer includes first wavelength conversion material particles, and
the first wavelength conversion material particles are configured to convert the first light into green light.

7. The backlight unit of claim 6,
wherein the first wavelength conversion layer includes second wavelength conversion material particles, and
the second wavelength conversion material particles are configured to convert the first light into red light.

8. The backlight unit of claim 6, further comprising:
a second wavelength conversion layer disposed on the second light guide plate,
wherein the second wavelength conversion layer includes red fluorescent material particles.

9. The backlight unit of claim 2,
wherein the first light source overlaps the second light source in a substantially vertical direction.

10. The backlight unit of claim 2,
wherein the first light source and the second light source are disposed oppose each other, and the first light guide plate and the second light guide plate are disposed between the first light source and the second light source.

11. The backlight unit of claim 2, further comprising:
a reflective member disposed under the first light guide plate.

12. The backlight unit of claim 11,
wherein the first light guide plate includes a first scattering pattern disposed on a surface opposite to a surface facing the first wavelength conversion layer, and the second light guide plate includes a second scattering pattern disposed on a surface facing the first wavelength conversion layer.

13. The backlight unit of claim 12,
wherein the first light guide plate includes a first edge surface between an upper surface or lower surface of the first light guide plate and one side surface of the first light guide plate, and the second light guide plate includes a second edge surface between an upper surface or lower surface of the second light guide plate and one side surface of the second light guide plate.

14. The backlight unit of claim 12, further comprising:
a first tape member covering the side surface of the first light guide plate opposing the side surface of the second light guide plate; and
a second tape member covering the side surface of the second light guide plate opposing the side surface of the first light guide plate,
wherein each of the first tape member and the second tape member includes a light reflecting material.

15. The backlight unit of claim 1, wherein the first light source faces a lower surface of the first light guide plate, and the second light source is disposed adjacent to one side surface of the second light guide plate.

16. The backlight unit of claim 15,
wherein the first light source includes a printed circuit board and a plurality of light emitting elements, and
the plurality of light emitting elements are arranged in a matrix form spaced apart from each other.

17. The backlight unit of claim 16,
wherein a peak wavelength of the first light is about 390 nm to about 410 nm, and
wherein a peak wavelength of the second light is about 430 nm to about 470 nm.

18. The backlight unit of claim 17,
wherein the first wavelength conversion layer includes first wavelength conversion material particles and second wavelength conversion material particles, and
the first wavelength conversion material particles are configured to convert the first light into green light, and the second wavelength conversion material particles are configured to convert the first light into red light.

19. A display device, comprising:
a backlight unit including a first light guide plate, a first low refractive layer disposed directly on the first light guide plate, a second light guide plate disposed over the first light guide plate, a wavelength conversion layer disposed directly on the first low refractive layer between the first light guide plate and the second light guide plate, a first protective layer disposed directly on the wavelength conversion layer and the first light guide plate, an optical filter disposed directly on the first protective layer between the first wavelength conversion layer and the second light guide plate, a first light source disposed at a location which is lower than the first wavelength conversion layer and configured to emit a first light, and a second light source disposed adjacent to one side surface of the second light guide plate and configured to emit a second light; and
a display panel disposed over the backlight unit,
wherein a wavelength of the first light is shorter than a wavelength of the second light,
wherein the second light is blue light, and
wherein the optical filter is configured to reflect blue light and to transmit green light and red light.

20. The display device of claim 19, further comprising:
an optical film,
wherein the optical film is disposed between the backlight unit and the display panel, and includes at least one of a prism film, a diffusion film, a microlens film, a lenticular film, a polarizing film, a reflective polarizing film, and a retardation film.

21. The display device of claim 20, wherein the first light source is disposed adjacent to one side surface of the first light guide plate.

22. The display device of claim 21,
wherein a peak wavelength of the first light is about 390 nm to about 410 nm, and a peak wavelength of the second light is about 430 nm to about 470 nm, and
wherein the wavelength conversion layer includes first wavelength conversion material particles and second wavelength conversion material particles, and
the first wavelength conversion material particles are configured to convert the first light into green light, and the second wavelength conversion material particles are configured to convert the first light into red light.

* * * * *